(12) United States Patent
Boonie et al.

(10) Patent No.: US 7,941,347 B2
(45) Date of Patent: May 10, 2011

(54) SELF CANCELLING PRODUCT ORDER BASED ON PREDETERMINED TIME PERIOD

(75) Inventors: E. Maria Boonie, Hopewell Junction, NY (US); Lisa L. Godwin, El Dorado Hills, CA (US); Michael L. Gregor, Endicott, NY (US); Richard H. Janey, Jr., Danbury, CT (US); Danna M. Lambert, Cedar Park, TX (US); Jeffrey L. Seidell, Goldens Bridge, NY (US); Bradley D. Swick, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 11/867,257

(22) Filed: Oct. 4, 2007

(65) Prior Publication Data

US 2008/0027825 A1    Jan. 31, 2008

Related U.S. Application Data

(63) Continuation of application No. 10/426,158, filed on Apr. 28, 2003, now Pat. No. 7,334,225.

(51) Int. Cl.
*G06Q 30/00* (2006.01)

(52) U.S. Cl. ........ 705/26.25; 705/26; 705/27; 705/26.1; 705/27.1; 705/27.2; 345/619; 320/110; 380/55

(58) Field of Classification Search ............ 705/26, 705/27; 380/55; 320/110; 345/619
See application file for complete search history.

(56) References Cited

U.S. PATENT DOCUMENTS

| 5,365,587 A | 11/1994 | Campbell et al. |
|---|---|---|
| 5,530,749 A | 6/1996 | Easter et al. |
| 5,530,753 A | 6/1996 | Easter et al. |
| 5,553,144 A | 9/1996 | Almquist et al. |
| 5,640,569 A | 6/1997 | Miller et al. |
| 5,671,281 A | 9/1997 | Campbell et al. |

(Continued)

FOREIGN PATENT DOCUMENTS

WO    WO 00/56025    2/2000

OTHER PUBLICATIONS

Buyus, Rajkurnar; Stockinger, Heinz; Giddy, Jonathan; Abramsom, David; "Economic Models for Management of REsources ni Grid Computing", p. 1-13, 2001.

(Continued)

*Primary Examiner* — Yogesh C Garg

(74) *Attorney, Agent, or Firm* — John E. Campbell

(57) ABSTRACT

A provider server receives an order from a customer by way of a workstation for a customer selected configuration change of computing resources of an end user machine, the provider server having a predetermined time period and negotiates configuration change price for billing said customer for the purchase of said ordered customer selected configuration change, said negotiated configuration change price for billing said customer for the purchase of said ordered customer selected configuration change. If the customer takes delivery of said customer selected configuration change within said predetermined time period, the provider server billing said customer for said delivered customer selected configuration change, however if the customer does not take delivery of said customer selected configuration change within said predetermined time period, the provider server cancelling said order and cancelling said billing according to said configuration change price based on expiration of said predetermined time period.

23 Claims, 10 Drawing Sheets

U.S. PATENT DOCUMENTS

| | | | |
|---|---|---|---|
| 5,878,400 | A | 3/1999 | Carter, III |
| 6,086,618 | A | 7/2000 | Al-Hilali et al. |
| 6,094,702 | A | 7/2000 | Williams et al. |
| 6,125,372 | A | 9/2000 | White |
| 6,151,643 | A | 11/2000 | Cheng et al. |
| 6,167,567 | A | 12/2000 | Chiles et al. |
| 6,208,977 | B1 | 3/2001 | Hernandez et al. |
| 6,779,016 | B1 | 8/2004 | Aziz et al. |
| 6,826,538 | B1 | 11/2004 | Kalyan et al. |
| 6,963,854 | B1 | 11/2005 | Boyd et al. |
| 7,248,693 | B1 * | 7/2007 | Tretter et al. ............ 380/55 |
| 7,259,539 | B2 * | 8/2007 | Suzuki et al. ............ 320/110 |
| 2003/0200104 | A1 | 10/2003 | Heming et al. |
| 2004/0098314 | A1 | 5/2004 | Cool |
| 2004/0117290 | A1 | 6/2004 | Shacham |
| 2004/0215748 | A1 | 10/2004 | Boonie et al. |
| 2004/0220887 | A1 | 11/2004 | Byde et al. |
| 2006/0256130 | A1 * | 11/2006 | Gonzalez ............ 345/619 |

OTHER PUBLICATIONS

Foster, Dan; Kesselman, Carl; Tuecke, Steven; "The Anatomy of the Grid: Enabling Scalable Virtual Organizations", p. 200-222, 2001 Sage Publications.

Keon, Neil J; Anandalingam, G; "Optimal Pricing for Multiple Services in Telecommunications networks Offering Quality-of-Service Guarantees" p. 66-80, 2003, IEEE.

Muller, Jorg P; Pischel, Markus; "Doing Business in the Information Marketplace", p. 139-145, 1999 ACM.

* cited by examiner

SELF CANCELLING PRODUCT ORDER BASED ON PREDETERMINED TIME PERIOD

CROSS REFERENCE TO RELATED APPLICATIONS

This application is a continuation of U.S. patent application Ser. No. 10/426,158 "METHOD, SYSTEM, AND COMPUTER PROGRAM PRODUCT FOR ON DEMAND ENABLEMENT OF DORMANT COMPUTING RESOURCES" filed Apr. 28, 2003 now U.S. Pat. No. 7,334,225.

TRADEMARKS

IBM® is a registered trademark of International Business Machines Corporation, Armonk, N.Y., U.S.A. IBM ESERVER, ZSERIES, THINKPAD, and other names used herein may be registered trademarks, trademarks, or product names of International Business Machines Corporation or other companies.

FIELD OF THE INVENTION

The present invention relates in general to enablement of dormant hardware resources in a computing system. In particular, the present invention relates to enabling dormant computing resources by providing customer installable code to a computing system, the code being capable of enabling dormant computing resources.

BACKGROUND

As is known, there exists considerable variation in the needs of computer users. A "one size fits all" approach to providing computing resources, such as processor type, number of processors, memory, input/output (I/O) etc., is therefore impractical. To meet the various needs of users, therefore, providers of computing resources should have the ability to tailor the resources and capabilities of a particular system to the needs of a particular user.

As is also known, providers of computing systems and services operate in a highly competitive industry. In order to simultaneously maintain competitive pricing and adequate profit margins, computing providers must control costs. In particular, it is highly desirable for providers of computing systems to reduce the costs associated with manufacturing and inventory management of a proliferation of computing system models and configurations. Cost reductions may be achieved, therefore, by reducing the number of computing system models and configurations produced, inventoried, and sold.

While the above objectives appear contradictory, methods have been developed to simultaneously reduce manufacturing and inventory complexity while tailoring computing system resources to the needs of specific users. For example the following patents, each of which is assigned to the same assignee as the present application and each of which is hereby incorporated herein by reference in its entirety, describe various aspects by which a computing system may be constructed with installed resources that are initially dormant: U.S. Pat. No. 5,365,587 to J. E. Campbell et al., entitled "Self Modifying Access Code for Altering Capabilities"; U.S. Pat. No. 5,530,749 to R. J. Easter et al., entitled "Methods and Apparatus for Secure Hardware Configuration"; U.S. Pat. No. 5,530,753 to R. J. Easter et al., entitled "Methods and Apparatus for Secure Hardware Configuration"; U.S. Pat. No. 5,553,144 to F. A. Almquist et al., entitled "Method and System for Selectively Altering Data Processing System Functional Characteristics Without Mechanical Manipulation"; U.S. Pat. No. 5,671,281 to J. E. Campbell et al., entitled "Self Modifying Access Code for Altering Capabilities." As taught in the referenced patents, initially dormant computing resources may be activated or enabled as needed, thereby allowing a system provider to manufacture a reduced number of system models, each of which may be easily configured in a variety of ways simply by enabling various combinations of the initially dormant resources.

Computer systems having dormant resources may provide advantages to computer users as well. Such systems may be delivered to a customer location containing a set of installed hardware resources, only some of which are enabled. The remaining dormant resources may be enabled at a future date, at the customer location and without installing additional hardware resources. Such an arrangement provides a simplified path for the user to upgrade system resources.

While advances have been made in the underlying technologies enabling the activation of dormant computing resources, the technologies and methods used to deliver these capabilities to computer users have not kept pace. While the needs of computer users may change in rapid and unpredictable ways, the technologies and methods used to deliver system upgrades reflect an environment where system upgrades required the installation of physical hardware resources. These delivery technologies and methods do not, therefore, fully exploit the capabilities of the underlying technologies used to enable dormant resources.

For the foregoing reasons, therefore, there is a need in the art for an on demand method of enabling dormant computing resources that is responsive, flexible, and which leverages the capabilities of existing computer upgrade technologies.

SUMMARY

The shortcomings of the prior art are overcome, and additional advantages are provided, through the provision of a method, system, and computer program product for enabling a subset of dormant computer hardware resources in an upgradeable computer system having a set of dormant computer hardware resources.

In one aspect of the present invention, the method includes accepting an electronic customer request to enable the subset of dormant hardware resources; and providing, to a customer accessible console in communication with the upgradeable computer system, computer readable instructions capable of enabling the subset of dormant resources, where the computer readable instructions are customer installable.

Various enhanced aspects of the present invention are described and claimed herein. In one aspect, the present invention involves storing data describing a current configuration of the system to be upgraded, where the data describes hardware resources currently installed and resources currently enabled. Further aspects of the present invention involve updating the stored configuration information to represent a new configuration upon installation of control code, and presenting, prior to accepting an order, current configuration information and information describing dormant resources available to be enabled. A further enhanced aspect of the present invention involves generating a pricing methodology prior to accepting an order. One embodiment of a pricing methodology involves determining a price per unit of performance, determining a set of performance values indicating the increase in performance expected to be achieved by enabling certain resources, and generating a price by multiplying the price per unit by the total performance increase expected by enabling selected resources. Further enhanced aspects of the present invention involve presenting, prior to accepting an order, information describing a current configuration of the system to be upgraded, and information describing a proposed configuration of the system to be upgraded; another aspect involves presenting a price for the proposed configuration. Further enhanced aspects of the present invention involve approving an order substantially concurrently with providing the instructions, and, in one enhanced aspect of the present invention, providing the instructions prior to approving the order.

Corresponding systems and computer program products are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION

In accordance with preferred embodiments of the present invention, a method, system, and computer program product are disclosed for enabling a subset of dormant computer hardware resources in an upgradeable computer system, the upgradeable computer system having a set of dormant computer hardware resources.

Figure 1:
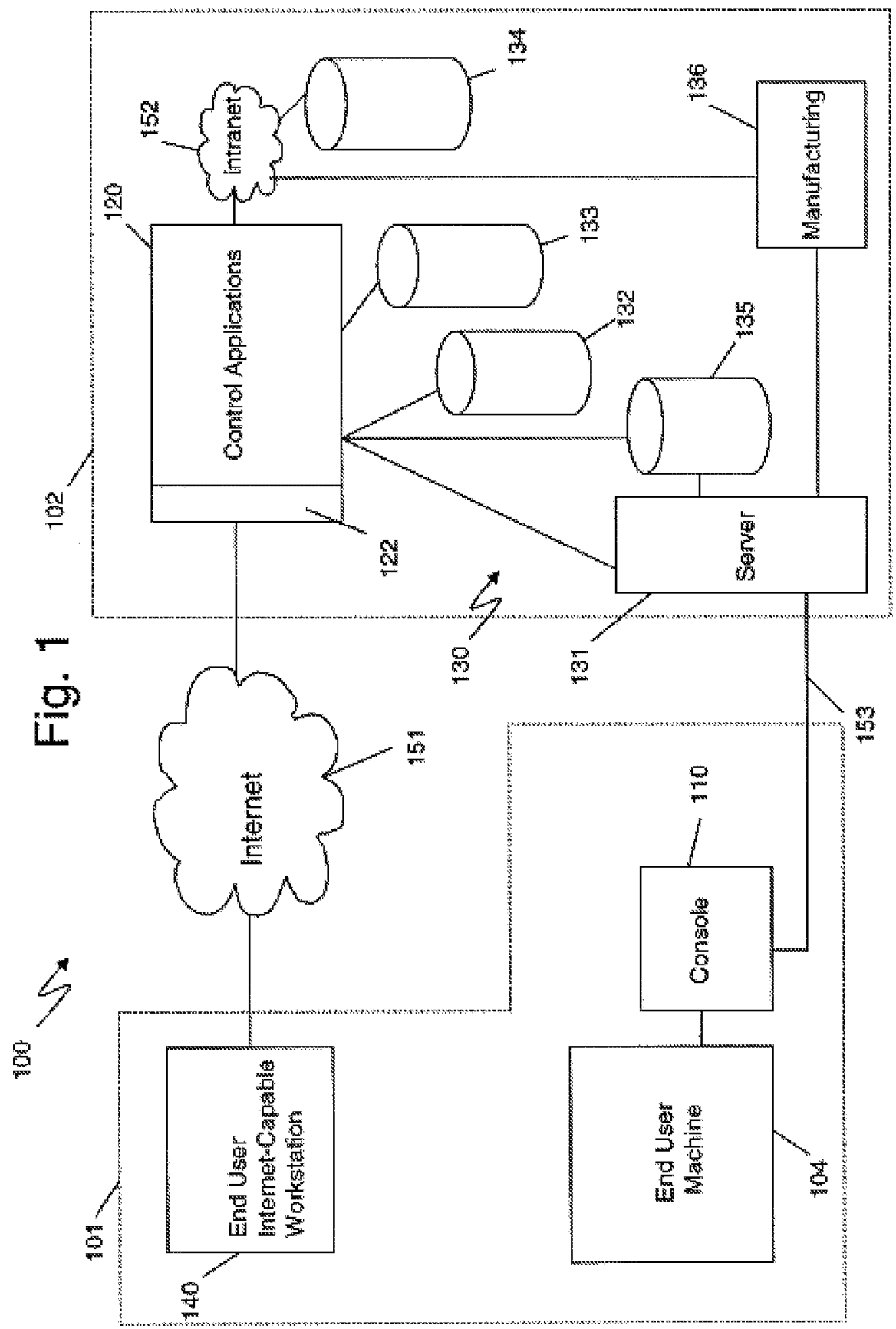
FIG. 1 illustrates a computing environment per an embodiment of the present invention.

FIG. 1 illustrates a preferred embodiment of a computing environment in which the advantages of the present invention are illustrated. Computing environment 100 contains, for example, a user enterprise 101, a provider enterprise 102, and one or more communication links between enterprises 101 and 102, such as an Internet communication link 151 and a private communications link 153. User enterprise 101 contains an Internet capable workstation 140, an upgradeable end user machine 104, and a customer accessible console 110 in communication with end user machine 104. Provider enterprise 102 includes a server 120, a set of one or more databases and servers 130, and further includes an internal communications link such as intranet 152. Additionally, provider enterprise 102 further includes at least one provider organization involved in the generation of control code, such as manufacturing 136.

As further illustrated in FIG. 1, user workstation 140 is in networking communication with a user interface component 122 of server 120. As described in detail herein, a user desiring to enable dormant computing hardware resources installed in end user machine 104 may use workstation 140 to access provider server 120 via the Internet 151 and user interface 122. Server 120 is further in communication with server/database collection 130, directly or through provider intranet 152. At least one server is in communication with console 110 via communications link 153, such as server 131. Through link 153, provider enterprise systems 102 are informed of hardware configuration changes in end user machine 104. Also through link 153, an operator using console 110 downloads control code from server 131 for subsequent installation on end user machine 104, thereby enabling certain dormant computing resources 106 installed in end user machine 104.

Figure 2:
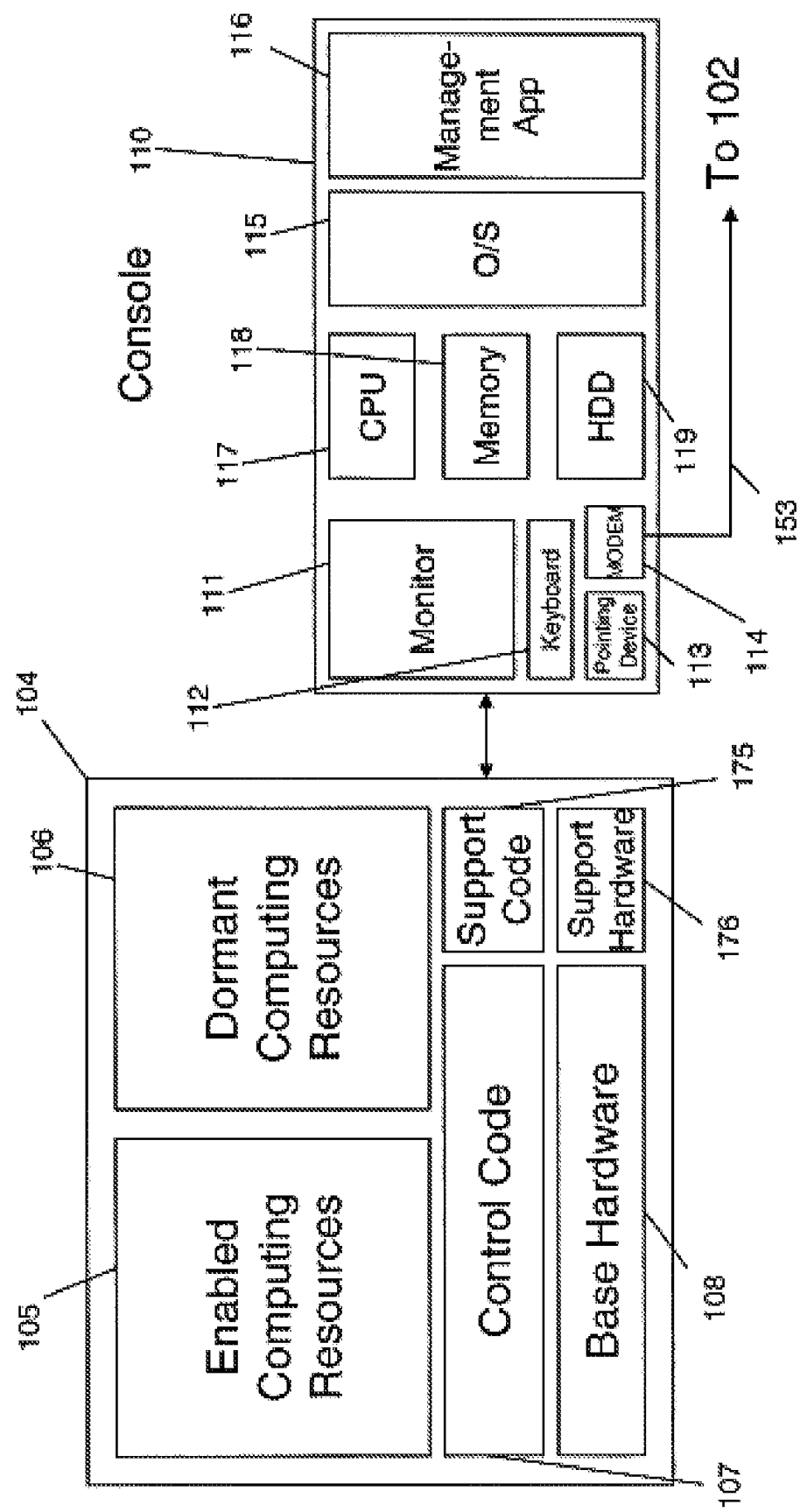
FIG. 2 illustrates an upgradeable customer system per an embodiment of the present invention.

With reference now to FIG. 2, additional details of end user machine 104 and console 110 are described. System 104 includes a set of computing resources 105 and 106. Resources 105 and 106 include hardware resources that are capable of being installed in a dormant state and subsequently activated or enabled by control code 107, such as processing units (PU), memory, and Input/Output (I/O). As illustrated in FIG. 2, end user machine 104 includes enabled resources 105, and dormant resources 106. Dormant resources 106 are installed but not enabled: resources 106 may be activated or enabled through the installation of appropriately coded instructions, such as hardware control code 107 utilizing support code 175. End user machine 104 further includes base hardware 108, such as the machine's frame(s), cooling unit(s), power supply (s), intra-machine connections, and support hardware 176. Base hardware 108 performs functions such as power, cooling, and storage of control code, and is not upgradeable through changes in hardware control code 107. Support hardware 176 provides storage of support code 175 as well as a service interface used for maintenance of end user machine 104. Support code 175 contains hardware configuration information pertaining to computing resources 105 and 106, such as computing resources being utilized (for example, processors and memory). As used herein, end user machine 104 is currently upgradeable if there is a set of dormant resources 106 available to be enabled through installation of new control code 107 utilizing support code 175. The methods of the present invention may be used to enable a subset of the set of the available dormant resources 106, up to and including the entire set of available dormant resources 106. In preferred embodiments of the present invention, end user machine 104 is an IBM® server or other server capable of supporting on demand activation of dormant computing resources, such as an IBM ESERVER™ ZSERIES® machine (for example, the IBM 2064 and 2066 machines, all models), which support the capability to enable additional PUs and memory, up to the amount dormant on a particular machine. Additional information regarding IBM ZSERIES systems is found in "IBM eServer zSeries 900 Technical Guide," IBM Publication Number SG24-5975-01, published September 2002, which is hereby incorporated herein by reference in its entirety (hereinafter "Technical Guide"). In preferred embodiments of the present invention, support hardware 176 is a portable computer, such as an IBM THINKPAD® portable computer (for example, the IBM 2366-43U) running support code 175, and further running an operating system as known in the art, such as the IBM OS/2® operating system Version 4.5, as well as other application programs which, for instance, read and store data on the support hardware 176, and transfer configuration data between the support hardware 176 and the control code 107. In preferred embodiments of the present invention, support hardware 176 and the control code 175 are delivered as standard or optional features of end user machine 104. In preferred embodiments of the present invention, console 110 is a hardware management console (HMC), implemented by a personal computer as known in the art, such as an IBM 8305-KUU or other personal computer, and is preferably delivered as a feature of end user machine 104. Console 110 is user accessible, is in communication with and provides a user interface to one or more end user machines 104 for the purpose of monitoring operation of connected machine(s) 104, assigning a pseudonym to each end user machine 104, configuring and controlling enabled computing resources 105 and I/O paths, enabling transmission and retrieval of control code 107 by utilizing support code 175 and updates to management application 116, between end user machine 104 and the control code distribution server 131 and end user machine configuration reporting database 135. Console 110 includes input devices as known in the art, such as keyboard 112 and pointing device 113. Console 100 includes an output device, such as monitor 111. Console 110 further includes at least one processor 117, memory 118, and nonvolatile storage such hard disk drive (HDD) 119. Console 110 further includes operating system 115 and user hardware management application 116. Further details of support hardware 176 (also referred to as Support Element (SE) in preferred embodiments), and console 110 (HMC in preferred embodiments) may be found in Technical Guide, Appendix B. In preferred embodiments of the present invention, operating system 115 is a personal computer operating system as known in the art, such as IBM OS/2 Version 4.5 operating system. Operating system 115 supports the basic operation of console 110, including all of its components. Management application 116 provides the functionality and user interface by which an operator may perform various hardware management functions for end user machine 104, including assignment of a user-defined pseudonym to each end user machine 104, control of enabled computing resources 105, logical configuration of I/O paths, basic monitoring of end user machine operation, including utilization, alert monitoring, etc., as well as downloading and installing new control code 107 by utilizing support code 175, and updates to management application 116. Console 110 includes communication hardware, such as modem 114, capable of communicating with provider enterprise 102 via communication link 153. In preferred embodiments of the present invention, communications link 153 is dedicated phone line with direct dial to sever 131; in preferred embodiments of the present invention, server 131 is the IBM RETAIN® system. As described in detail herein, an operator at console 110 may download new hardware control code from provider enterprise 102 via communications link 153, and subsequently install the downloaded code as new support code 175 on support hardware 176 on end user machine 104, thereby enabling a subset of resources 106.

As previously noted, methods of enabling or activating dormant computing resources through installation of properly coded hardware control code are known in the art. For example, U.S. Pat. Nos. 5,365,587, 5,530,749, 5,530,753, 5,553,144, 5,671,281, discussed in the Background and incorporated herein by reference in their entirety, discuss various aspects by which hardware resources may be installed in a dormant state and subsequently enabled through installation of appropriately coded control code. Further information regarding computer system hardware upgrades through the installation of control code is found in Technical Guide, section 6.2, which was previously incorporated herein by reference in its entirety.

The code installation process of the present invention involves specific support code 175 functions that are invoked from the support hardware 176. Support code 175 provides all functions required to initiate an upgrade to end user machine 104 including download and installation of control code associated with an upgrade. These functions communicate with hardware functions within the control code 107 and control hardware 108. Validation is performed on the downloaded control code to be installed by the support code 175 to ensure that it is properly downloaded and is not corrupted during transmission from server 131 through the console 110 to support hardware 176. Once validation is confirmed, the new control code is passed to control code 107 and control hardware 108 and the appropriate dormant computing resources 106 are enabled accordingly, completing installation of the upgrade.

Figure 4:
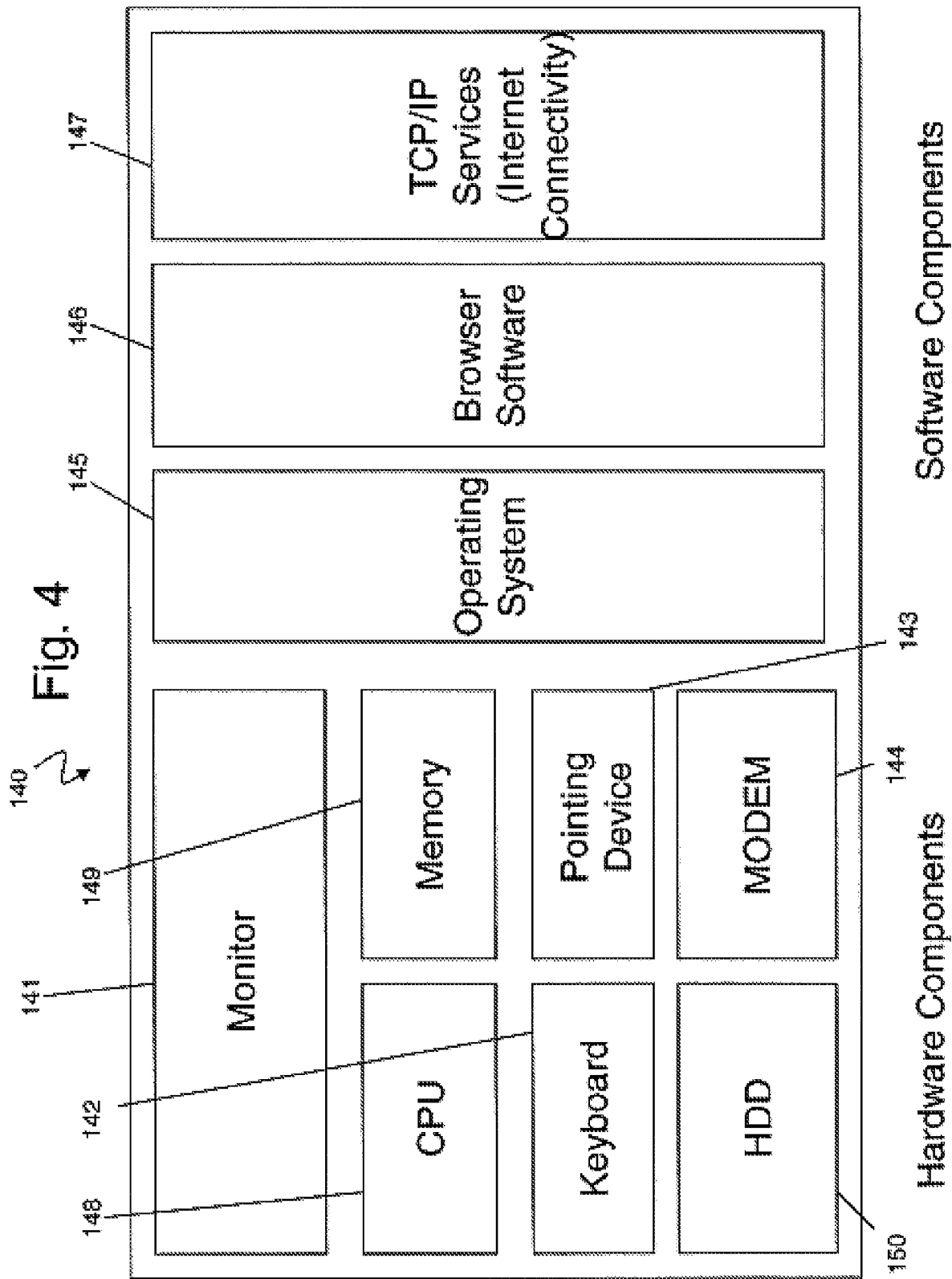
FIG. 4 illustrates a user workstation per an embodiment of the present invention.

With reference now to FIG. 4, additional details of user workstation 140 are described. Workstation 140 is an Internet capable computer as known in the art. Workstation 140 includes processor 148, memory 149, nonvolatile storage such as HDD 150, input devices such as keyboard 142 and pointing device 143, an output device such as monitor 141, and communications hardware such as modem 144 or other network communications devices as known in the art. Workstation 140 further includes operating system 145, Internet connectivity services such as TCP/IP services 147, and web browser 146. Workstation 140, as described in detail herein, is used to communicate with provider server 120 via Internet 151. In preferred embodiments of the present invention, workstation 140 is an IBM desktop personal computer or other Internet-capable workstation. In preferred embodiments of the present invention, operating system 145 is any version of MICROSOFT® WINDOWS®, LINUX®, IBM AIX® or other workstation operating system, and web browser 146 is a web browser as known in the art, such as MICROSOFT INTERNET EXPLORER® or NETSCAPE® NAVIGATOR®, capable of supporting a security protocol as known in the art, such as SSL, for secure access to server 120. Alternative embodiments are envisioned in which any web-enabled workstation 140 may be used, however.

Figure 3:
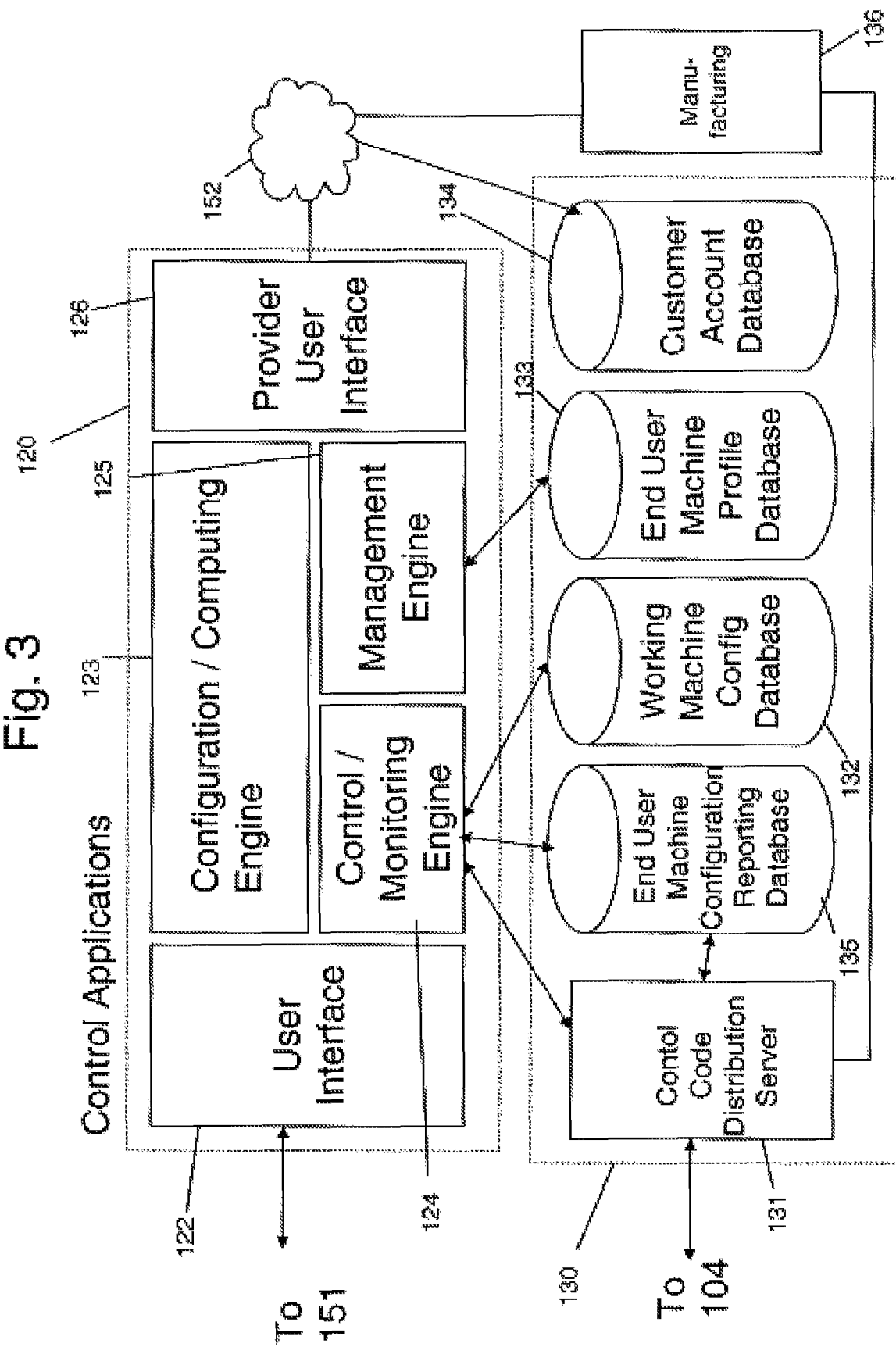
FIG. 3 illustrates a provider computing environment per an embodiment of the present invention.

With reference now to FIGS. 1 and 3, the components of a preferred embodiment of provider enterprise 102 are described. As illustrated in FIGS. 1 and 3, provider enterprise 102 includes two main components: server 120 and server/database collection 130. Provider enterprise further includes at least one organization involved in generating control code, such as manufacturing 136. Communication between server 120 and server/database collection 130 may be either direct or may take place over a network connection such as provider intranet 152. As illustrated in FIG. 3, server 120 includes user interface 122, configuration/computing engine 123, control/monitoring engine 124, management engine 125, and provider interface 126. Server/database collection 130 includes control code distribution server 131, with access to end user machine configuration reporting database 135, working machine configuration database 132, end user machine profile database 133, and customer account database 134. As illustrated in FIG. 1, to place an order a user operating web-enabled workstation 140 interacts with user interface component 122 of server 120 via Internet 151. In preferred embodiments of the present invention, user interface component 122 is an interactive web-based application, such as IBM's RESOURCE LINK™. In preferred embodiments of the present invention, server 131 is an IBM RETAIN server, which is preferably an IBM 9672-RX7 server. In preferred embodiments of the present invention, server 120 is an IBM RS/60000® model S80 machine.

Configuration/computing engine 123 includes a set of configuration rules for each model of upgradeable end user machine 104. Configuration rules ensure that a requested configuration does not exceed physical and technical capabilities of the specific end user machine 104. For instance, using information accessed through server/database collection 130, configuration/computing engine 123 determines the quantity of computing resources 105 and 106 contained in a specific end user machine 104. It then determines the allowed configurations for that specific end user machine 104, including allowable combinations of PUs and memory upgrades based on enabled computing resources 105 and dormant computing resources 106. These configuration rules are enforced during the order process, thereby insuring that a user is presented with upgrade options that are valid for the user's specific machine. For example, in preferred embodiments of the present invention, end user machine 104 is an IBM ESERVER ZSERIES z900, machine type 2064 with models ranging, for instance, from 101-109, where the third digit in the model designation reflects the number of Central Processors (CPs) that are part of the enabled computing resources 105, for instance a 101 has one active CP, a 109 has nine active CPs, etc. Further, designation as a model 101-109 describes that up to twelve PUs are available to be enabled, of which two may be configured as SAPs, 9 may be configured as CPs, IFLs, ICFs, and two are spares which may be substituted for any of the previous PUs in the event one should fail. This set of rules constitutes the configuration rules for an IBM ESERVER ZSERIES z900, machine type 2064, which are enforced by configuration/computing engine 123 during order process of the present invention, as described herein.

Management engine 125 communicates with end user machine profile database 133, in which machine profile data is stored for each specific machine 104 for which the present invention is to be used. As described in detail herein, a machine profile is created for each specific machine for which the present invention is to be used. The machine profile is created during a prerequisite process, described below. The machine profile uniquely identifies a specific machine using the machine type or model and serial number, and the customer or end user of the machine. Management engine 125 interacts with end user machine profile database 133 and configuration/computing engine 123, extracting end user machine profile information as required. Management engine 125 also interacts with end user machine profile database 133 and provider user interface 126 for ongoing maintenance of end user machine profile database 133.

Server 120 further includes control/monitoring engine 124, which is in communication with working machine configuration database 132. Control/monitoring engine 124 is further in communication with end user machine configuration reporting database 135 and control code distribution server 131, server 131 being in communication with console 110 via communications link 153 as previously described. Working machine configuration database 132 contains information describing the current configuration of end user machine 104, which has been extracted from end user machine configuration reporting database 135. The working machine configuration database 132, like the end user machine profile database 133, includes information for each specific machine for which the present invention is used. The current machine configuration includes information regarding which resources are currently enabled, such as resources 105, and which resource are installed but not available for use (i.e., dormant). Furthermore, the machine configuration stored in database 132 includes information regarding resources that are physically installed but no longer available, such as failed or damaged resources. As the configuration of end user machine 104 changes, end user machine 104 uses console 110 and communications link 153 to notify databases 132 and 135, through servers 131 and 120, of the change, thereby causing an update in the configuration record for end user machine 104. Control/monitoring engine 124 extracts information from working machine configuration database 132 for use by configuration/computing engine 123, providing configuration/computing engine with end user machine configuration information used in application of the configuration rules described above. Further, control/monitoring engine 124 creates control code, specific to the particular end user machine 104, reflective of an upgrade requested by the end user via their interaction with the end user interface 122. This created control code is staged on end user machine configuration reporting database 135, and transferred to control code distribution server 131 at the appropriate time as described below.

Figure 5:
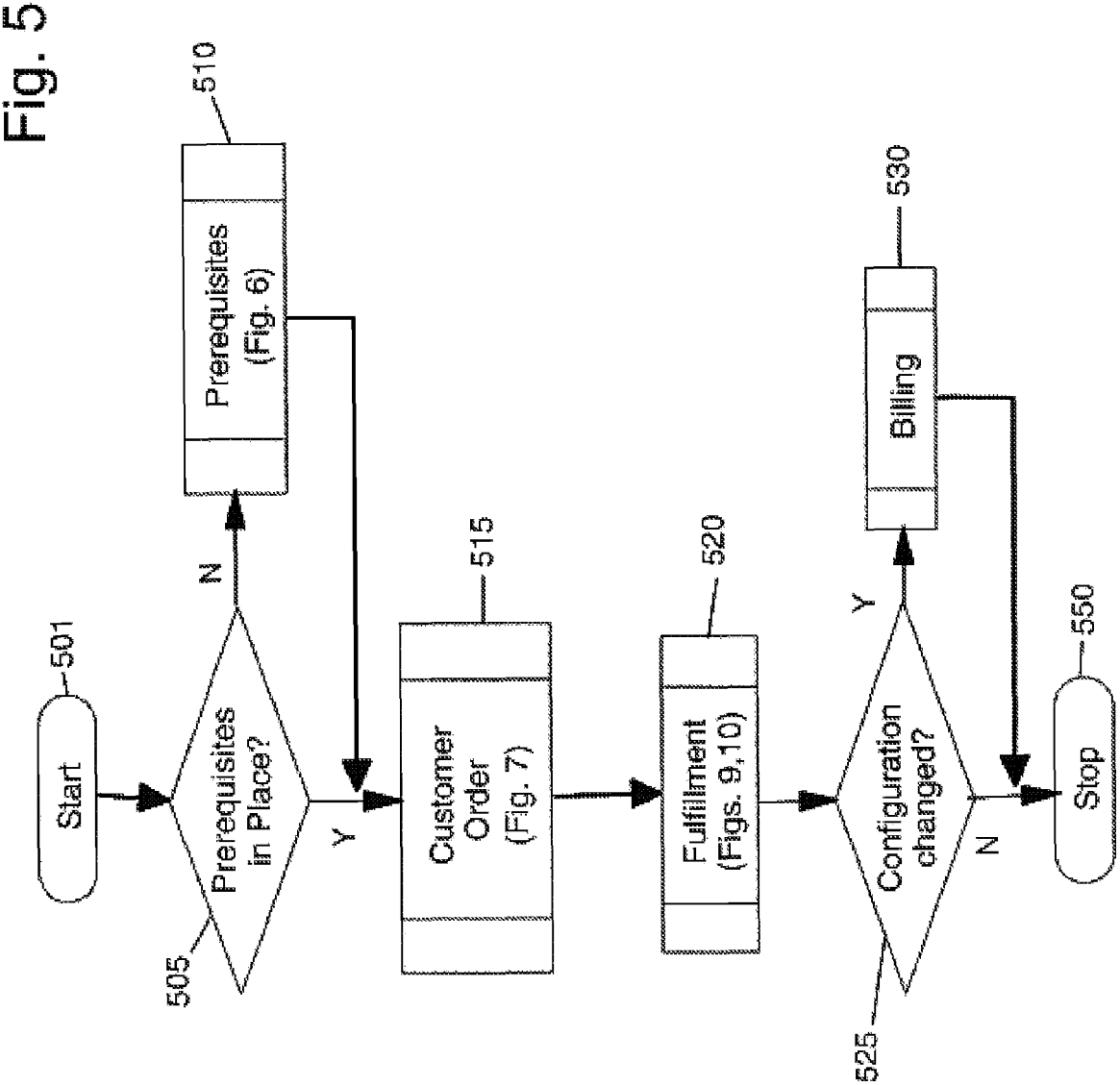
FIG. 5 illustrates an upgrade process per an embodiment of the present invention.

With reference now to FIGS. 1 and 5, an overview of an end user machine upgrade process of preferred embodiments of the present invention is described. Information regarding an upgrade process of the present invention is presented in Technical Guide, section 6.3 (Customer Initiated Upgrade, or CIU), which was previously incorporated herein by reference in its entity. Additional information regarding architecture and configuration rules of end user machines per preferred embodiments of the present invention are presented in Technical Guide, chapters 1 through 6, and Appendix B.

As illustrated in FIG. 5, the upgrade process starts at step 501. Before an order may be placed for an end user machine, various prerequisites should be in place, step 505. If the prerequisites are not in place, a one-time prerequisite process is performed, step 510. Once the prerequisites are in place for a specific end user machine, a customer initiates and places an order to upgrade the end user machine, at step 515. As previously discussed, a customer uses any workstation with Internet and world wide web access, such as workstation 140, to place an order. A provider receives a customer order at server 120. Upon receipt of a customer order, a provider fulfillment process 520 is performed. One aspect of fulfillment process 520 is providing new control code to a customer for download via console 110. In preferred embodiments of the present invention, control code may be downloaded by a customer and installed by a customer. Installation is performed using console 110; the installation of control code enables the set of resources ordered by the customer during step 515. In preferred embodiments of the present invention, billing step 530 is initiated upon successful installation of downloaded control code. As illustrated in FIG. 1, upon successful code install, a set of dormant resources 106 is enabled, thus modifying the configuration of end user machine 104. System 104 then notifies provider enterprise 102 of the configuration change. When provider enterprise 102 receives notice of the configuration change, step 525, billing process 530 is initiated. The order process is now complete, step 550.

Figure 6:
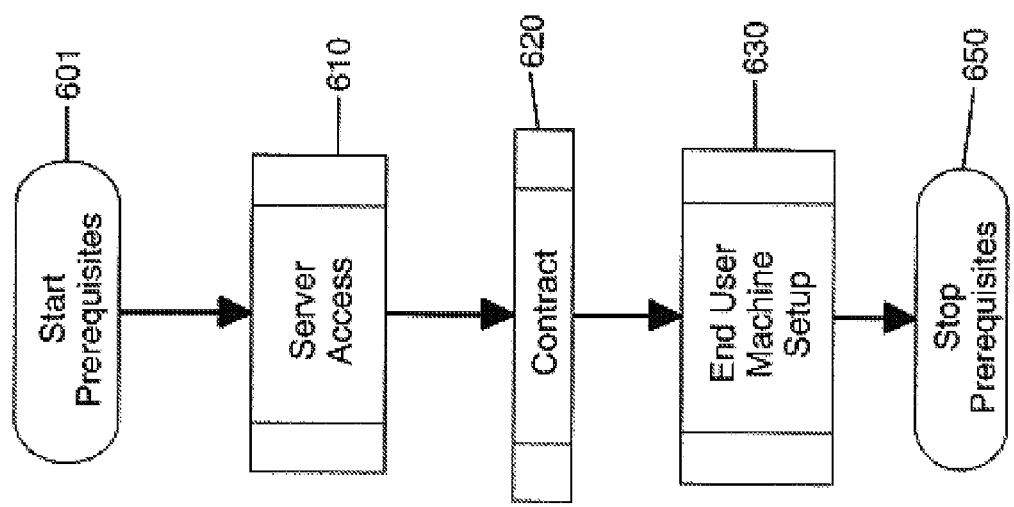
FIG. 6 illustrates a prerequisite process per an embodiment of the present invention.

With reference now to FIG. 6, a prerequisite process (step 510 of FIG. 5) of preferred embodiments of the present invention is described. As illustrated in FIG. 6, a prerequisite process of a preferred embodiment includes three components: server access 610, contract 620, and end user machine setup 630. In preferred embodiments of the present invention these steps are performed serially in the order illustrated in FIG. 6: alternative embodiments are envisioned, however, where these steps may be performed in a different order, or in parallel.

Server access 610 establishes a secure communication method between user workstation 140 and provider server 120, through interface 122. As noted, in preferred embodiments of the present invention interface 122 is an interactive web-based application, such as IBM's RESOURCE LINK application. Secure communication may be established by any security protocol and authentication methods known in the art: a security protocol such as SSL (secure sockets layer) is preferred, and authentication is preferably accomplished through the provision of a user ID and password. Access established in step 610 may be used by a specific customer for more than one upgradeable end user machine.

Contract step 620 establishes the basic business relationship between user and provider, within which end user machine upgrade orders are placed, fulfilled, and for which invoices are generated and payment is made. Contract step 620 also establishes the basic information needed by a provider to uniquely identify a specific end user machine and the set of installed resources on that end user machine. In preferred embodiments of the present invention, a single base contract or agreement is established between user and provider, under which multiple end user machines may be upgraded using the methods of the present invention. A specific contract supplement is then executed for each specific end user machine, each supplement including information uniquely identifying the specific end user machine. In preferred embodiments of the present invention, a base agreement includes the following terms: a) representation that the user owns the end user machine to be upgraded or has permission from the owner and lien holders to upgrade the end user machine, b) user is responsible for the use and security of any user ID(s) issued for access to provider's server(s), c) any upgrade order placed in this manner is considered to be a firm order and subject to the standard terms & conditions associated with orders placed with provider through other means, d) installation of ordered upgrade is considered to occur upon download of associated control code, e) the downloaded control code will self-install, f) the purchase price for an upgrade is the price quoted by provider's system during the order process, g) that approval from an optional secondary ID may be accepted by provider in lieu of a signed purchase order, and the user agrees to have appropriate processes in place to insure that secondary ID approval is the equivalent of a signed purchase order, h) appropriate termination provisions, i) an appropriate communication link is established between the end user machine to be upgraded and provider's enterprise, and through that link the user will transmit end user machine configuration information to the provider, j) user grants provider a security interest in an upgraded machine upon installation of control code associated with the upgrade, k) user agrees not to circumvent technological measures used to secure control code.

Once a base agreement is in place, a supplement may be established for each specific end user machine. The supplement establishes certain basic information about the machine and the user ID(s) authorized to order upgrades. In preferred embodiments of the present invention, the supplement documents the following information for each end user machine: a) user ID authorized to initiate an upgrade order, b) a unique customer identifier, such as a customer number, c) an end user machine type code, identifying the machine type and the installed computing resources, d) a unique end user machine identifier, such as a machine serial number. The user ID is the ID established during server access step 510. The customer identifier, such as a customer number, is a unique identifier associated with this customer throughout provider's enterprise. This identifier may be used to relate various provider records associated with a specific customer. The machine type code is a value that identifies the set of installed computing resources available within an end user machine. For example, in preferred embodiments of the present invention, an IBM ESERVER ZSERIES z900 machine is machine type 2064 with models ranging, for instance, from 101-109, where the third digit in the model designation reflects the number of acquired CPs. Further, designation as any model within the range 101-109 describes that up to twelve PUs are available, of which up to two may be configured as SAPs, up to 9 may be configured as CPs, IFLS, ICFs, and two are spares which may be substituted for any of the previous PUs in the event one should fail. The end user machine identifier is a value that uniquely identifies a specific machine throughout provider's enterprise 102, such as a unique serial number.

Additionally, preferred embodiments of the present invention optionally include a secondary approval ID. The optional secondary approval ID may be used by customers requiring an approval step, such as by a purchasing specialist, prior to final order submission. Each supplement indicates whether or not secondary approval is required for the specific machine, and if required, the secondary ID from which approval is to be provided.

Contract step 620 further includes creation of an end user machine profile, pricing, and customer notification. Once a supplement is executed for a specific machine, provider uses the machine-specific information to establish a machine profile. In preferred embodiments of the present invention, a machine profile includes the machine type code, machine serial number, customer number, user ID, and the secondary approver ID or an indication that secondary approval is not required for the end user machine. As illustrated in FIGS. 1 and 3, the end user machine profile information is stored in machine profile database 133. A pricing methodology is established for end user machine upgrades: in preferred embodiments of the present invention, pricing is established once an end user machine profile is created, however alternative embodiments are envisioned in which these steps are performed in a different sequence or in parallel.

In preferred embodiments of the present invention, an upgrade pricing methodology involves the following steps: a) establish a pricing metric or unit of measure, b) negotiate prices for the metric, and c) establish a relationship between end user machine hardware upgrade increments and the pricing metric. More than one pricing metric may be used for each end user machine. For example, preferred embodiments of the present invention price memory upgrades as follows: the pricing metric is gigabytes (GB) of memory, provider negotiates a price per GB with the customer. In this memory pricing model, there exists a direct relationship between the pricing metric (GB) and end user machine hardware upgrade increments (also measured in GB). Preferred embodiments of the present invention support the pricing of I/O paths on a peer-path basis, such that there is a specific price for each I/O path enabled, in the event I/O paths are offered through this embodiment. Preferred embodiments of the present invention price processor upgrades as follows: the pricing metric is a performance measurement, such as capacity units; provider negotiates a price per capacity unit with the customer; provider establishes a relationship between the number of active processors and the performance metric. For example, Table 1 below provides the estimated performance increase in MSUs (Millions of Service Units) expected by the addition of the $n^{th}$ processor, where n goes from 1 to the maximum number of processor installed in the specific model of the end user machine. The price for a specific upgrade is determined by adding the incremental performance numbers for each added processor, and multiplying the total expected performance increase by the negotiated price per capacity unit. Subsequent negotiations between provider and customer may modify the pricing methodology simply by renegotiating the price per metric (price per GB, price per capacity unit).

TABLE 1

2064 Family of Processors ("Models 101-109" family)

| Processor No. | Incremental Performance (MSUs) | Cumulative Performance (MSUs) |
|---|---|---|
| 1 | 43 | 43 |
| 2 | 36 | 79 |
| 3 | 35 | 114 |
| 4 | 33 | 147 |
| 5 | 32 | 179 |
| 6 | 28 | 207 |
| 7 | 28 | 235 |
| 8 | 24 | 259 |
| 9 | 24 | 283 |

Alternative pricing methodologies are possible, within the spirit and scope of the present invention. For example, an alternative pricing method useful for both memory and processor upgrades involves calculating a price based on a percent of a known reference price for the individual memory or processor upgrade request. The reference price is pre-loaded within the end user machine profile database 133. Furthermore, memory upgrades can be discounted based on a processor upgrade being purchased along with the memory upgrade. Finally, once a machine profile is created and a pricing methodology is established, provider may notify the customer that the upgrade process of the present invention is available for the specific machine.

In preferred embodiments of the present invention, once contract step 620 is complete, end user machine setup step 630 is executed. End user machine setup 630 operates through console 110 of FIGS. 1 and 2, enabling control hardware 176 to download control code from provider enterprise 102 via communications link 153, and further enabling support code 176 to install the downloaded control code on end user machine 104. End user machine setup 630 is completed by issuing an INSTALL request to server 131 from provider server 120. The next time the support code 175 initiates a call home (i.e., a call to server 131) using facilities provided by console 110, server 131 remotely installs the CIU enablement feature using support code 175 running on support hardware 176.

Figure 7:
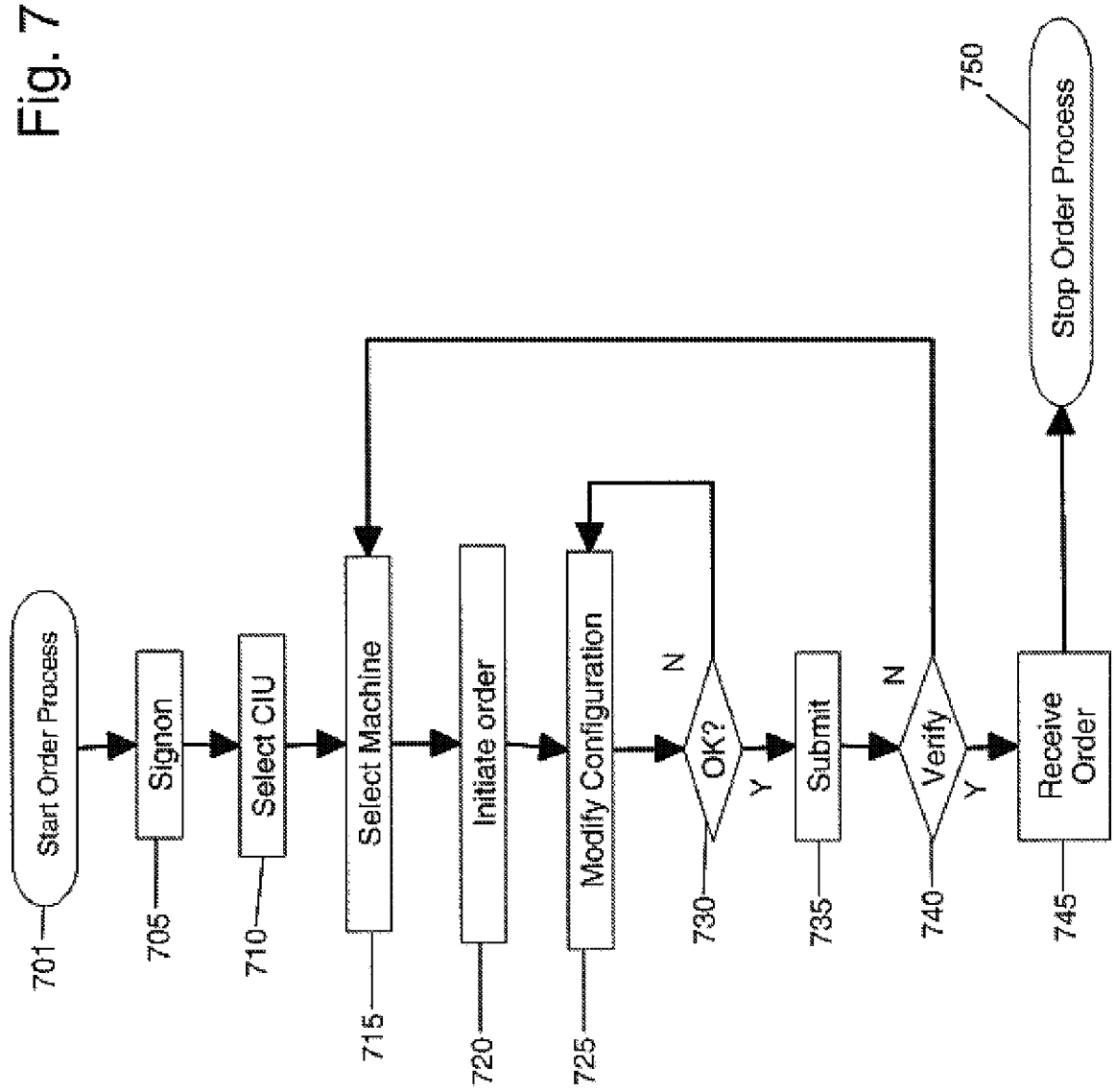
FIG. 7 illustrates an order process per an embodiment of the present invention.

With reference now to FIG. 7, a customer order process (step 515, FIG. 5) of preferred embodiments of the present invention is described. While many of the process steps are described from a user perspective, it is understood that a corresponding provider process enables the user steps described; the steps of the corresponding provider process are also described herein. To upgrade an end user machine, a user starts by entering the user ID established during the contract process (FIG. 6, step 620), and a password associated with the user ID, to sign on to user interface 122 of server 120, at step 705. In preferred embodiments, user interface 122 is IBM RESOURCE LINK. Additional information regarding RESOURCE LINK is presented in Technical Guide, Appendix D, which was previously incorporated herein by reference in its entirety. Server 120 validates the user's ID and password, and authorizes user access to machine profiles corresponding to end user machines associated with the validated user ID during a prerequisite process as described herein with reference to FIG. 6. Interface 122 may provide a user with a variety of options in addition to end user machine upgrades; to initiate an upgrade order when a variety of options are presented a user selects the upgrade option, step 710, which in preferred embodiments of the present invention is referred to as Customer Initiated Upgrade (CIU). Once the user selects the CIU option, the user is presented with a list of end user machines associated with the user ID, and for which the prerequisite process of FIG. 6 is complete. In preferred embodiments of the present invention, the user is presented with the following information for each listed end user machine: machine type, machine serial number, customer number, pseudonym, user ID, and the secondary approver ID associated with this end user machine or an indication that no secondary approval is required. In preferred embodiments of the present invention, the first three fields listed (type, serial number, customer number) are presented in a single field and are used to uniquely identify a specific machine. Server 120 provides the end user machine list by accessing user machine profile database 133 (FIGS. 1 and 3), retrieving all machine profile records associated with the specific user ID, and presenting the retrieved records to a user via interface 122. As previously noted, the association between user ID and one or more end user machines is established during the prerequisite process of FIG. 6 A user may then select a specific machine from the list of machines presented, step 715.

Upon receipt of the user's end user machine selection, step 715, server 120 accesses working machine configuration database 132, to retrieve the current hardware configuration of the selected end user machine. Server 120 then presents, via interface 122, a machine profile (from end user machine profile database 133, FIG. 1) and information relating to the current configuration of the machine (from working machine configuration database 132, FIG. 1). In preferred embodiments of the present invention, the current configuration information includes an indicator of the total number of processors enabled (such as a model number), and the number of processors currently enabled in a variety of configurations. Upon reviewing the current machine configuration information, a user selects an order initiation option, step 720, to begin reconfiguring end user machine 104. Server 120 responds by presenting an order screen to the user, displaying the current configuration and a target configuration, the target configuration being initialized to the current configuration when the order screen is first presented. The order screen is interactive, allowing a user to modify the target configuration, step 725, and receive updated information regarding further configuration options based on the new target configuration. A user may iteratively modify the target configuration until acceptable, steps 725 and 730.

In preferred embodiments of the present invention, each processing unit (PU) may be configured in a variety of ways: as a central processor (CP), system assist processor (SAP), integrated facility for LINUX (IFL), or an internal coupling facility (ICF). CPs are considered general purpose processors, and are used for execution of end user application programs. IFLs are a specialized processor, limited to the execution of the LINUX operating system, corresponding prerequisite software, and user application programs which run in the LINUX environment. SAPs are specialized processors used by the machine (not by the end user or end user application programs) for processing of input/output data. ICFs are specialized processors used by the machine (not by the end user or end user application programs) for interaction between virtual computing environments executing on the same end user machine.

When presenting the end user machine configuration, server 120 lists the current model number (or other indicator representing the total number of available processors), and the number of processing units configured as each possible type. In preferred embodiments of the present invention, server 120 presents the current configuration in a column called "current configuration" with a line item for model number, and a line item for each PU type. The current configuration column also displays the current amount of memory enabled in end user machine 104. Server 120 also presents a second column of data in the order screen of steps 725 and 730, representing the target or upgrade configuration: in preferred embodiments of the present invention, the same line items are used for the target configuration: model, PU type (i.e., CP, ICF, IFL, and SAP), and memory.

In preferred embodiments of the present invention, the target configuration is presented in a series of drop down boxes, where the contents of each box is initialized to the current configuration (i.e., model, number of active PU's of each type, and active memory). Upon selecting a drop down box, a user is presented with a set of values from which to select. The set of values represents the valid upgrade options available for the specific line item, based on the existing end user machine profile and configuration, and any target configuration inputs entered by the user during the present order session. The user creates a target configuration by selecting from the listed values in each drop down box, for the model designation and for each resource type, step 725. Selecting a new model determines the total number of processing units available for enablement, as previously discussed with reference to configuration rules. In response to user selection of a new model, configuration/computing engine 123 of server 120 determines a new set of possible PU configurations for each PU type, and updates the PU drop down boxes accordingly. As the user selects upgrade options for each processor type, the total number of processors available to be enabled in other configurations may be reduced. The set of values presented in the drop down boxes is dynamically updated each time a user modifies the target configuration, thereby continually presenting only valid upgrade options. Server 120 accomplishes the dynamic update through a set of configuration rules enforced by configuration/computing engine 123, as previously described.

Figure 8:
FIG. 8 illustrates an order entry screen of an embodiment of the present invention.

FIG. 8 illustrates an interactive order entry screen 800 of a preferred embodiment of the present invention. Order entry screen 800 is used during order entry, steps 725 and 730 of FIG. 7. Order entry screen 800 includes machine/order identifying information 810, sufficient to uniquely identify the specific machine being upgraded and the specific order being created. In preferred embodiments of the present invention, machine/order identifying information 810 includes information extracted from the machine profile (customer number, machine type, and machine serial) to uniquely identify the specific machine being upgraded, and an order number to uniquely identify the order. Order entry screen 800 further includes configuration information 820, purchase price 830, and action buttons 840. As previously described, configuration information 820 includes a line item for PU type, plus a model line item. Configuration information 820 includes two columns of data: current configuration data, and upgrade configuration data. Current configuration data is not customer alterable; it represents the current configuration of end user machine 104 as stored in databases 132 and 135. Upgrade configuration information is customer alterable, and is the means by which a customer creates a target configuration for end user machine 104. Valid options for each line item in the upgrade configuration are presented to the user for selection, by any method as known in the art, such as a drop down box. Purchase price 830 contains the purchase price for the current upgrade configuration, based upon the pricing methodology established during a prerequisite process as illustrated in FIG. 6. Purchase price 830 is dynamically updated each time a user modifies the upgrade configuration data. Finally, action buttons 840 allow a user to submit an order once the user is satisfied with the upgrade configuration and price, (FIG. 7 step 735) or cancel the order.

Configuration information 820 provides valid upgrade options to a user, limiting user input to configurations that do not exceed the total installed resources of end user machine 104 (i.e. resources 105 and 106), as constrained by configuration rules specific to end user machine 104. A variety of options exist, for the presentation of configuration information 820. For example, in one embodiment of the present invention, illustrated in order entry screen 800, configuration information 820 includes the following line items: model, ICF, LINUX, SAP, and memory. No line item appears for general purpose CP processor units: this information is determined by subtracting the total number of specially configured PUs (ICF, LINUX, SAP) from the total number PUs indicated as enabled by the model designation. For example, in the embodiment illustrated in order entry screen 800, the current order upgrades end user machine 104 from a model 107 to a model 108, increasing the number of enabled PUs by one, from 7 enabled PUs to 8. The upgrade configuration indicates a total of 2 specially configured PUs: the order is thus increasing the number of CPs from 5 enabled to 6 enabled. In this embodiment, no CP line item is needed. Alternative presentations are possible, within the spirit and scope of the present invention. For example, in another embodiment of the present invention, a line item is presented for each PU type, including CP, for the current and upgrade configurations. In this embodiment, a model designation is used to identify the resources installed in end user machine 104, whether or not enabled. In other words, the model designation identifies the total set of resources 105 and 106. In this embodiment, each PU type is explicitly shown in a line item: to increase the number of general purpose CPs in this embodiment, a user makes a new selection in the drop down box for the CP line item, upgrade configuration column.

In preferred embodiments of the present invention, all configuration rules relating to end user machine 104 are enforced during the order process, steps 725 and 730. As described above, many configuration rules are enforceable through the use of drop down boxes having dynamically updated values from which a user makes selections. In some circumstances, however, one or more selections may interfere with some other option or configuration rule not represented by a drop down box. In such circumstances, the methods of the present invention provide feedback by issuing a warning to the user. For example, for end user machines 104 with a feature such as IBM Capacity Backup Upgrade (CBU) enabled (CBU is an offering which provides an enterprise with internal disaster recovery services by allowing for the on-demand increase in a designated end user machine's number of CPs), configuration/computing engine 123 will recognize when an upgrade configured through this present invention will enable CPs otherwise designated for availability to CBU, in which case the server 120 will present the end user with notification that the specified upgrade will reduce the number of CPs available for CBU. Additional information regarding CBU is presented in Technical Guide, section 6.4, which was previously incorporated herein by reference in its entirety.

In preferred embodiments of the present invention, server 120 further calculates a price for the upgrade based upon the current target configuration and the pricing methodology established in the prerequisite process of FIG. 6. Each time a user modifies the target configuration, step 725, server 120 provides an updated order price and an updated set of upgrade options. The user may then use this information to determine if the target configuration and price are acceptable step 730. If not, the user iterates steps 725 and 730 until the target configuration and price are acceptable. At this point, the user submits an order for the target configuration, step 735. Upon receipt of the customer's order submission, server 120 provides an order verification screen to the customer. The order verification screen includes the current configuration, the target configuration, the order price, and a list of terms under which the customer may accept the order. The customer reviews the order verification screen, step 740, and decides whether or not to accept the order. If the customer accepts the order, the order is submitted and received at server 120 for subsequent fulfillment processing (step 520, FIG. 5). The customer is then presented with an order confirmation screen, showing the current configuration, the ordered configuration, and a message indicating that a current order is in process for this machine. In preferred embodiments of the present invention, an order history is provide, showing the status of all upgrade orders placed for the specific machine. Table 2 lists types of status indicators associated with order processing per preferred embodiments of the present invention.

TABLE 2

| Order Status | Description |
| --- | --- |
| Needs price agreement | The price for the selected upgrade needs to be assigned. |
| Needs customer approval | The customer order is placed, however customer has not agreed to the terms and conditions statement. |
| Needs secondary approval | The customer secondary order approver needs to approve the order. |
| Processing credit | The credit check for the customer is in process. |
| Needs lease agreement | The lease company needs to get lease approval. |
| New order | Order is ready to be processed in RETAIN server |
| Download ready | Order is processed in RETAIN server and the LICCC records are ready for download. |
| Downloaded | Customer download of order is complete, and billing is initiated. |
| Partial install | Customer installation of the order is partially complete. |
| Installed | Customer installation of the order is complete. |
| Cancelled | The order is cancelled. |
| Completed | The order is installed and billing for the order is completed. |

If the customer does not accept the order, step 740, processing returns to step 715, where the customer can configure another order.

An optional secondary approval step may be performed at this time, if the customer establishes the requirement for secondary approval, along with a secondary approver ID, during the prerequisite process of FIG. 6. If secondary approval is required, additional process steps are performed upon customer order verification, step 740. Upon order verification for an end user machine requiring secondary approval, server 120 notifies the secondary approver ID associated with the machine corresponding to the verified order. In preferred embodiments of the present invention, notification is sent by email, the notice including the following information: customer name, end user machine type and serial number designation, current configuration, upgrade configuration, and purchase price, plus an explanation of why the notification is sent to the secondary approver, and instructions for authorizing the order. The secondary approver uses an Internet capable workstation, such as workstation 140 or similar workstation, to sign on to server 120 via interface 122 using the secondary approver ID. The secondary approver is presented with a screen providing information pertaining to the requested upgrade (specific machine, requested upgrade, purchase price). The secondary approver types in his Purchase Order Number in the field provided on the screen, using his keyboard 142, and selects "I Approve" using pointing device 143. Should the secondary approver select "I Do Not Approve", the server 120 cancels this request for an upgrade and sends email notification to both the primary and secondary approver Ids. Although the use of secondary approval is optional, in preferred embodiments of the present invention using secondary approval, the secondary approver is a customer purchasing representative, and the secondary approval is the equivalent of a signed purchase order. As mentioned previously with respect to contract process 620 of FIG. 6, terms relating to secondary approval and purchase order requirements are included in the base agreement between customer and provider.

Figure 9:
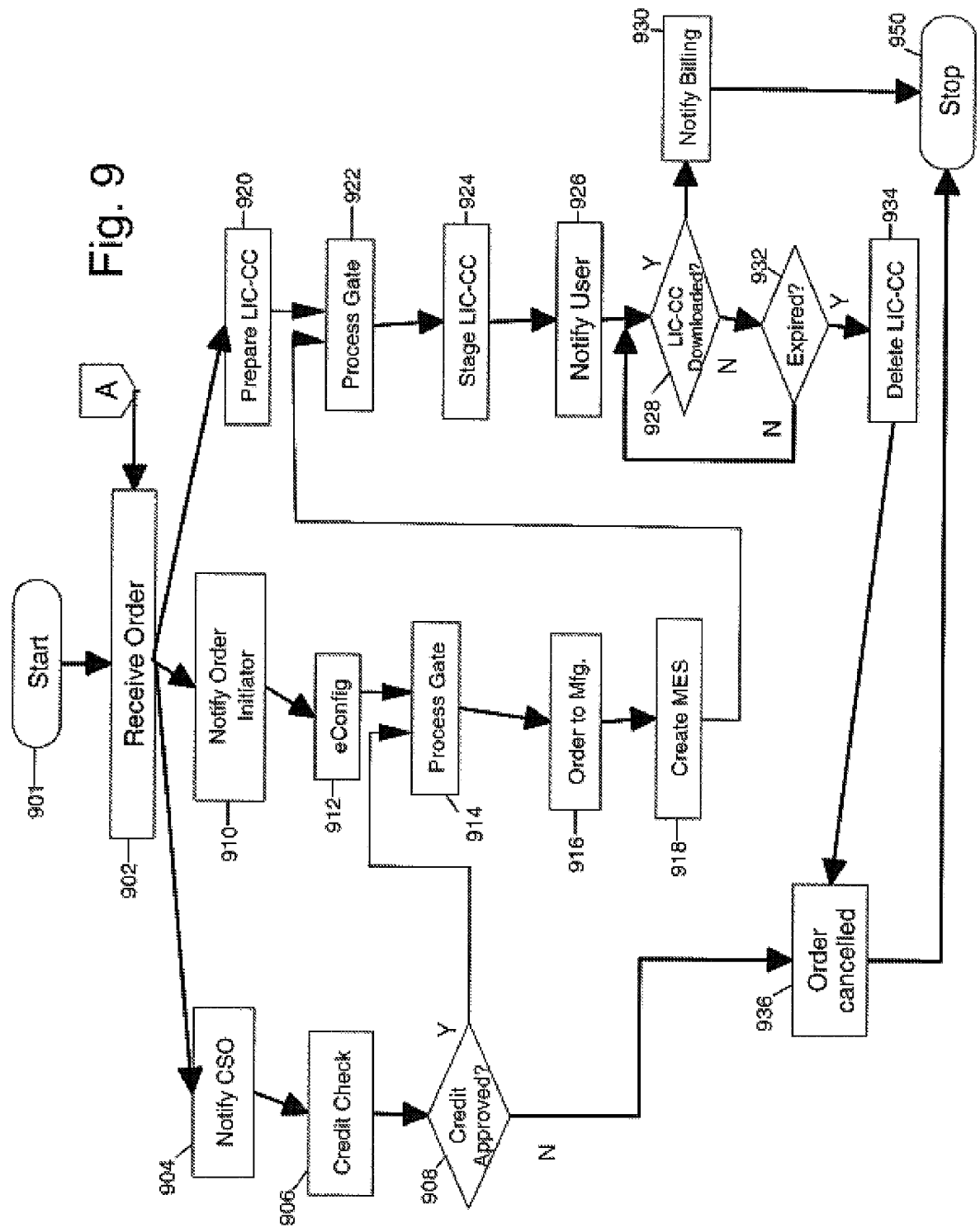
FIG. 9 illustrates a fulfillment process per an embodiment of the present invention.

With reference now to FIG. 9, a fulfillment process of preferred embodiments of the present invention is described. The FIG. 9 fulfillment process represents a preferred embodiment of fulfillment process 520, FIG. 5. As previously noted, the fulfillment process is triggered when the provider receives an electronic order, step 902, upon the conclusion of the order process of FIG. 7. The order may be received upon completion of customer verification (FIG. 7, step 740) if secondary approval is not required, or upon receipt of secondary approval if required for the machine corresponding to the electronic order.

The fulfillment process of FIG. 9 illustrates an important feature of the present invention: the use of parallel processing and process gates. This feature provides the ability to respond quickly to customer upgrade orders, effectively leveraging the underlying technologies to provide customer installable capacity upgrades on demand. As illustrated in FIG. 9 and described in detail below, once an order is received, step 902, processing begins in three parallel paths: credit verification (steps 904, 906, 908), order processing (steps 910, 912), and generation of control code (step 920). Unlike a traditional manufacturing environment producing physical assets per a customer order, the end user machine upgrade process of the present invention produces a deliverable consisting entirely of computer readable instructions. As described in detail below, these instructions are generated by a provider server, such as server 120. Therefore, unlike a traditional manufacturing environment, deliverables may be produced in parallel with operations such as credit verification, with minimal risk to the provider. Parallel paths are subsequently joined using gates (steps 914 and 922), where processing proceeds upon completion of all parallel paths leading into the gate. Through parallel processing and process gates, a code deliverable is provided to a user shortly after conclusion of provider's internal approval process.

Fulfillment begins when an electronic customer order is received or upon receipt of secondary approval if required, step 902. Upon receipt of an order or secondary approval, three process steps are initiated in parallel: step 904, step 910, and step 920. Each path is described in detail herein.

Credit approval begins with step 904, notification of provider's credit approval organization. In preferred embodiments of the present invention, Customer Service Operations (CSO) is notified by server 120, through provider interface 126. In preferred embodiments of the present invention, interface 126 is IBM RESOURCE LINK. In preferred embodiments of the present invention, CSO notification is accomplished by email, and the notification includes customer name and customer number designation, end user machine type and serial number, purchase price, plus an explanation of why this information is being provided and instructions for responding to the notice. Using the notice information passed in step 904, CSO performs a credit check on the customer placing the order, step 906, as known in the art. If credit is approved, processing continues to gate step 914, joining the order entry process of steps 910 and 912 (described below). If credit is not approved, processing continues to step 936 where the order is canceled and the customer is notified.

Order entry begins with step 910, notification of the provider function responsible for initiating the order entry process. In preferred embodiments of the present invention, server 120 sends the notification, via provider interface 126. The notification includes customer name and customer number designation, machine type and serial number designation, configuration of order as requested by the end user. Provider's order initiation organization uses a configuration tool (called "eConfig" in preferred embodiments) to translate the customer's requested upgrade order into the exact machine type, model and/or feature code designations required for order processing and billing (step 910, FIG. 9). This information is generated by the configuration tool, and is passed to the order entry system, step 912. Once in the order entry system, this information is used to generate invoices and to update the provider's install base records. Upon completion of order entry, step 912, the order entry processing path joins the credit approval processing path at gate 914. Gate 914 allows processing to continue to step 916 only upon the successful completion of steps 908 and 912, thereby joining two parallel processing paths. After gate 914, an order is entered and forwarded to manufacturing, step 916, allowing manufacturing to update their records and reflect, for revenue accounting purposes, shipment of the ordered upgrade to this customer. Manufacturing creates an order number for this upgrade order, step 918, using the information passed in step 916. In preferred embodiments of the present invention, the order number is a Miscellaneous Equipment Specification (MES) number. The MES number is used in subsequent processing to identify the order, and associate the control code used to implement the order with billing information. Once created, therefore, the MES number is passed to provider's customer account database, such as database 134 of FIG. 1, along with other order information used in creating an invoice for the upgrade, such as customer number, machine model, machine serial number, and purchase price. The MES number is further used for the generation of other purchase transaction documents.

At this point (step 918) in fulfillment process illustrated in FIG. 9, provider's internal approval process is complete. As illustrated in FIG. 9, therefore, provider's internal approval process includes a credit approval process and an order entry or administrative process.

The control code deliverable is created at step 920, in parallel with provider's internal approval process, which consists of credit approval (steps 904, 906, and 908) and order entry (steps 910 and 912). As previously discussed, the present invention involved a deliverable consisting of control code capable of enabling or activating a subset of dormant resources 106. In preferred embodiments of the present invention, the control code deliverable is licensed to the customer rather than sole—title to the code remains with provider. In preferred embodiments of the present invention, therefore, the control code is called Licensed Internal Code-Controlled Configuration (LIC-CC, or LICCC). A control code deliverable, or LICCC, may be produced in a variety of ways. Preferred embodiments of the present invention create LICCC deliverables in one of two ways: as ordered, or in advance of an order. For example, for systems having a manageable number of possible configurations, such as the IBM ESERVER ZSERIES 2064 and 2066 machines, all possible upgrade configurations for the control hardware 108 are determined in advance using data in the working machine configuration database 132. This analysis and computation occurs when the machine is initialized for CIU capability by the provider server 120, i.e., during prerequisite process 510. A GENERATE request is sent to manufacturing 136, manufacturing generates and sends all support code LICCC records for the specific customer machine to server 131, where the LICCC records are stored for future customer order requests. The data contained within the LICCC is encrypted and will only be capable of being used on the specific end user machine for which it is created. This security is accomplished by using a burned in key that is within the given processor, memory, or I/O unit for which the LICCC applies, and this key is used when generating the specific LICCC records within manufacturing 136. The code is encrypted in manufacturing 136 when it is generated and can only be decoded on the given hardware for which the code is intended. When the customer initiates a download for the specific order using support code 175 from the support hardware 176, the LICCC record is securely downloaded to the machine in the form of a file. Support code 175 decodes the record and applies it to the machine using control code 107. Alternatively, for end user machines 104 having a large number of possible upgrade configurations, such as an IBM ESERVER ZSERIES 2088, it is more efficient to generate the LICCC records on demand. Under these circumstances, LICCC records are generated within the end user machine configuration reporting server 131 upon a customer request to download a specific CIU upgrade order. This eliminates the need to pre-generate all possible upgrade combinations. The same download and install process is used as described herein with reference to systems for which all LICCC records are created in advance.

Once the control code or LICCC is created and stored, processing continues at gate 922, where order entry and credit processing merge with the control code process. While the control code or LICCC is produced whether of not the credit and order entry processes are successfully completed, gate 922 prevents the control code from being made available to the customer until credit and order entry processing are successfully complete (i.e., provider's internal approval process). Once the order number (called "MES number" in the preferred embodiment) is recorded through the provider user interface 126, management engine 125 releases the control code prepared for this order. At step 924, the control code or LICCC is made available for customer download, or "staged" for download. Staging is accomplished by sending the control code to server 131. Once the control code or LICCC is staged in server 131, the customer is notified that the code is available for download, step 926. In preferred embodiments of the present invention, server 120 notifies the customer via email, informing the customer that the LICCC for an upgrade is available for download, and provides the date upon which the availability of this LICCC will expire. In preferred embodiments of the present invention, the control code or LICCC may be downloaded for a specified period of time after staging, after which time the code expires. After the customer is notified that the control code is available for download, step 926, provider waits until one of two possible events occurs: the customer downloads the code, or the code expires. If the customer download the control code, step 928, database 131 notifies server 120, which updates customer account database 134, thereby notifying provider's billing organization that code download is complete. In preferred embodiments of the present invention, an order is cancelable by a customer at any point prior to download. Once download is complete, however, the order is no longer cancelable. In preferred embodiments of the present invention billing is notified of code download, however the customer is not invoiced until server 131 receives notification from customer end user machine 104 that the control code installation is complete. Alternatively, if the customer fails to download the control code, step 928, server 120 determines whether the code has expired, step 932. If the code has not expired, processing continues at step 928. If the code has expired, step 932, processing continues at step 934, where the control code or LICCC is deleted from server 131. Processing then continues at step 936, where the customer is notified that the order has been canceled. Preferred embodiments of the present invention apply a 30 day expiration period.

The download process is initiated by the end user customer. The customer logs onto console 110 and selects the appropriate end user machine 104 and associated control hardware 176 for which he wishes to download and install upgrade code. In preferred embodiments, the customer executes the Single Object Operations task, available through management application 116. This allows the user to log directly on to support hardware 176 and make appropriate selections to apply the upgrade, which in the preferred embodiment is done by selecting the Perform Model Upgrade option. The end user is then instructed to enter in the order number which equates to the specific upgrade control code that is staged on the end user machine configuration reporting database server 131. When the end user enters the order number, a communication request is initiated from support hardware 176 directly to the end user machine's console where a connection is established to server 131 using the console modem 114. The order number is sent to server 131 and verified against outstanding orders for the specific end user machine 104, including its support hardware 176 and control hardware 108. If a match is found, the upgrade control code is downloaded to the specific end user machine's support hardware 176. The connection from console 110 to the server 131 ends and the upgrade enablement function is continued on the support hardware 176 via support code 175. All records that are downloaded to the support hardware 176 are encrypted and can only be decoded within the support code 175, control code 107, and associated control hardware 108 using keys linking the upgrade's control code to the specific end user machine.

The code installation process involves specific functions contained in the support code 175 functions that are invoked from the support hardware 176. These functions communicate with hardware functions within control code 107 and control hardware 108. Validation is performed on the upgrade's control code by the support code 175 to ensure proper download, i.e., that the code is not corrupted during transmission from server 131 through console 110 to support hardware 176. Once validation is confirmed, the upgrade control code is passed to the end user machine control code 107 and control hardware 108 and the appropriate dormant computing resources 106 are enabled accordingly, completing installation of the upgrade.

With reference now to FIG. 5, billing trigger step 525 and billing step 530 are described. As previously noted, all information required to generate an invoice for the customer order is passed to customer account database 134 upon customer download of the control code or LICCC, step 930 of FIG. 9. In preferred embodiments of the present invention, code staging to server 131 merely passes data and notification, but does not trigger generation of an invoice. As shown in FIG. 5, step 525, invoice generation is triggered by customer download and installation of the control code or LICCC, the event that results in a changed configuration of end user machine 104. Upon customer installation of the control code, the configuration of end user machine 104 is changed to the target configuration specified during order process, step 514. When the configuration of end user machine 104 is thus changed, end user machine 104 uses connection 153 between console 110 and server 131 to notify server 131 of the configuration change. This notification triggers two events: configuration update, and billing. Upon notification of a configuration change from end user machine 104, server 131 notifies server 120 of the configuration change, server 120 then updates the working machine configuration database 132 to reflect the new configuration of end user machine 104 such that server 120 has access to the most current detailed configuration associated with that machine. As previously noted, the fulfillment process of FIG. 9 provides database 134 with all information needed to generate an invoice, step 525 triggers invoice generation.

Alternative embodiments of the present invention are envisioned, such as: an upgrade processed for leased end user machines, an express upgrade process, and a temporary upgrade process, and a upgrade remarketing process. Each alternative is described in detail herein, with reference to the aspects of the basic process (FIG. 5) that are modified for each embodiment.

The invention has thus far been illustrated in a circumstance where the customer owns the machine to be upgraded, however, there may be circumstances where the customer merely leases the machine from another party. The lessor may be the provider, or a third party. While the customer may wish to initiate an upgrade order, provider's processes should insure lessor's approval of the order, and insure lessor's commitment to pay provider for the ordered upgrade. When end user machine 104 is leased, prerequisite process 510 of FIG. 5 is modified to establish the appropriate business relationships among the parties. In particular, contract step 620 of the prerequisite process of FIG. 6 is modified in two ways. First, a lessor approval ID is assigned to the machine profile associated with the leased machine. The lessor approval ID is analogous to the optional customer secondary approval ID: when present, notice is forwarded to the lessor approval ID upon customer order verification (step 740, FIG. 7) if customer secondary approval is not required, or upon receipt of customer secondary approval if required. Second, an additional agreement is executed between provider and lessor, establishing the terms under which provider accepts and fulfills upgrade orders for the leased machine. The important terms of this agreement require lessor to agree to provide authorization for the upgrade order, and to pay provider for the upgrade upon customer installation. In preferred embodiments of the present invention, lessor may authorize orders on a case-by-case basis, or may provide blanket authorization for a specific machine. The blanket authorization remains in effect until revoked by lessor.

As previously described, order process 515 is modified when end user machine 104 is leased: in addition to order verification and customer secondary approval (if required by customer), lessor authorization is required prior to order fulfillment. Once the customer order is verified (or further approved, if required by customer), lessor is notified of the pending upgrade order, preferably via email, sent by server 120 via Internet 151 to the ID provided by the lessor in their contract document. This notice provides lessor with customer name, machine type and serial number designation, requested upgrade configuration and identification number, and purchase price. To authorize the order, lessor accesses server 120 through interface 122, using workstation similar to workstation 140. Lessor signs on using the lessor approval ID associated with end user machine 104 during the modified prerequisite process. Lessor selects the appropriate upgrade request using the upgrade identification number and selects either "I Approve" or "I Do Not Approve" using his pointing device 143.

Although the base process embodiment previously described results in significant reduction in the time necessary for a provider to deliver a computer hardware upgrade, further improvements are possible in keeping with the spirit and scope of the present invention. As previously mentioned in the discussion of FIG. 9, the nature of the deliverable involved (i.e., computer readable instructions, rather than custom built hardware) allows a provider to create the deliverable in parallel with internal approval and administrative processes, without incurring significant risk. In other words, a provider loses little by creating a deliverable for an order that is not approved. The provider significantly improves responsiveness, however, by producing the deliverable in parallel with internal approval and administrative processes.

Further improvements in responsiveness may be obtained by an alternative embodiment of the present invention, wherein the deliverable is provided to the customer before internal approval and administrative procedures are complete. The increased risk encountered by the provider may be managed through appropriate procedures, and through additional terms and conditions in the agreement between provider and customer. The additional terms and conditions are part of a modified prerequisite process, step 510 of FIG. 5. The procedures are part of a modified fulfillment process, step 520 of FIG. 5. While in practice the modified prerequisite process takes place prior to fulfillment, the fulfillment process modifications are described first to provide a better framework for describing the additional terms involved in the modified prerequisite process.

Figure 10:
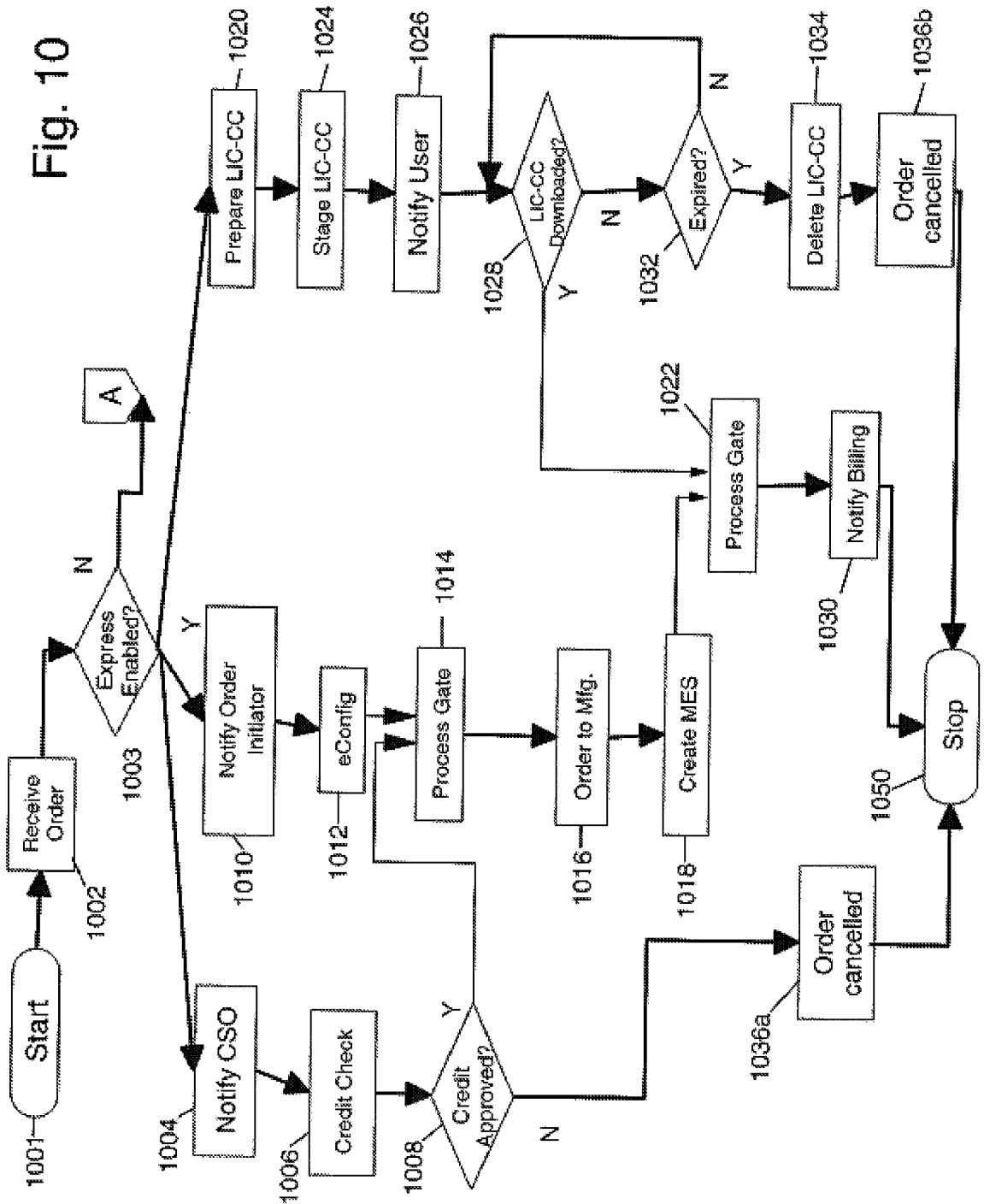
FIG. 10 illustrates an express fulfillment process per an embodiment of the present invention.

FIG. 10 illustrates an express upgrade fulfillment process, per an embodiment of the present invention. The express process embodiment illustrated in FIG. 10 is similar in many respects to the base fulfillment process embodiment illustrated in FIG. 9. Fulfillment begins when an order is received, step 1002, analogous to step 902 of FIG. 9. Alternatively, as in the base process embodiment of FIG. 9, fulfillment may begin when secondary customer approval is received (if required), or when lessor approval is received (when end user machine 104 is leased). When the appropriate condition occurs (order received, customer of lessor approval received), express processing continues to step 1003, where the profile for end user machine 104 is extracted from profile database 133. During the modified prerequisite process, a field is established in the profile for end user machine 104 indicating whether or not the express process is enabled for end user machine 104. The express process is enabled if, during the prerequisite process, the customer desires the enhanced responsiveness of the express process, and agrees to the additional terms. If the express process is not enabled, step 1003, processing continues with the base fulfillment process of FIG. 9, step 902. If the express process is enabled for end user machine 104, processing continues in a similar fashion to the base process of FIG. 9, where three processes begin in parallel: credit (1004, 1006, 1008), order administration (1010, 1012), and code generation (1020). Credit processing is performed in the same manner as the base process embodiment of FIG. 9: steps 1004, 1006, and 1008 are identical to steps 904, 906, and 908, respectively, and are therefore described herein with reference to FIG. 9. Administrative processing is performed in the same manner as the base process embodiment of FIG. 9: steps 1010, 1012, 1014, 1016, and 1018 are identical to steps 910, 912, 914, 916, and 918, respectively, and are therefore described herein with reference to FIG. 9. Finally, code generation, step 1020, is performed in the same manner as the base process of FIG. 9, and is described herein with reference to FIG. 9, step 920.

As illustrated in FIG. 10, the express process embodiment differs from the base process in the order of steps following code generation, step 1020. In the express process embodiment of FIG. 10, the control code or LICCC is made available to the customer, or "staged" in database 131, as soon as code generation (step 1020) is complete. In contrast, the base process embodiment of FIG. 9 included gate step 922 after code generation 920, thereby allowing processing to continue to code staging 924 only upon successful completion of credit and administrative processes (steps 904 through 918). Providing the control code or LICCC prior to completion of credit and administrative process involves a tradeoff for customer and provider. Provider gains an improvement in responsiveness that may be unattainable in a traditional process where credit approval is obtained prior to providing the ordered deliverable. Provider's risk is increased in exchange, since the deliverable is provided prior to credit approval, thus introducing the possibility that a deliverable may be provided to a customer who is unable to meet provider's credit approval requirements. Similar tradeoffs exist for the customer: upgrades are provided sooner, however the customer may need to agree to additional terms, allowing provider to manage the increased risk. Once the control code or LICCC is staged for download in database 131, the customer is notified that the control code is ready for download, step 1026. Step 1026 is analogous to step 926, FIG. 9. Control code may now be downloaded by the customer, step 1028. If the control code is downloaded, processing continues to gate 1022. Gate 1022 allows processing to continue to step 1030, notify billing, only upon the successful completion of step 1018 (create MES) and upon customer code download, step 1028. Upon completion of both events, processing continues to step 1030, notify billing: this step is analogous to step 930 of FIG. 9. If the customer does not download the control code, processing continues through step 1032, where the code expiration date is checked. If the code expires, the LICCC is deleted from database 131, step 1034, and the order is canceled, step 1036*b*. Steps 1032, 1034, and 1036*b* are analogous to steps 932, 934, and 936, respectively.

The express process embodiment introduces the possibility that an order may be canceled after the LICCC is downloaded. Order cancellation step 1036*a* therefore differs from step 936 of FIG. 9. When, at step 1008, the customer's credit is not approved, processing continues to step 1036 *a*, order cancellation. Since code download, steps 1024 through 1028, are no longer gated by step 1018 (and preceding steps), control code may have been downloaded (at step 1028) when processing reaches step 1036*a*. When processing reaches step 1036*a*, server 120 determines if the control code has been downloaded (i.e., has step 1028 been processed). If not, the code is deleted from database 131 and the customer is notified of order cancellation, similar to actions taken in steps 1034 and 1036*b*, and steps 934 and 936. If the control code has been downloaded when processing reaches step 1036*b*, however, the customer has obtained an asset for which payment will not be received, and remedial actions are taken by provider. When this occurs, a RESTORE LICCC is created an staged for download in database 131, and the customer is notified that the RESTORE LICCC is available for download. The RESTORE LICCC represents control code that, when installed, restores end user machine 104 to its pre-order configuration. Periodic reminders may be sent to the customer to download the RESTORE LICCC.

The prerequisite process, FIG. 5 step 510, should be modified whenever the express fulfillment process is implemented. As previously mentioned, the machine profile created during the prerequisite process indicates that the express process is enabled for a specific machine. To manage provide's risk, additional terms may be used in the provider—customer agreement. For example, the following terms may be added to the base agreement: a) download and installation of control code does not constitute provider's acceptance of customer's order b) if provider does not accept customer's order, customer agrees to give provider access to the upgraded end user machine within a specified time periods for provider to restore the previously installed configuration, c) if provider does not accept customer's order, customer is no longer able to use the express process for any of provider's end user machines, d) customer is responsible for payment upon provider's acceptance of customer order, and e) customer agrees not to transfer ownership of a machine during provider's order acceptance period.

Further improvements in functionality may be obtained by an alternative embodiment of the present invention, wherein the deliverable is provided to the customer on a temporary basis. All components of the invention described in FIGS. 1-4 provide the same function as previously described herein. In order to participate in this process, the end user must accept additional contract terms obligating them to pay for usage of additional computing resources until such time as they return these additional computing resources to the dormant classification, thus rendering these additional computing resources once again as unavailable until reacquired at some point in the future, either permanently or temporarily.

The temporary process embodiment introduces a requirement to monitor the end user machine 104 such that changes to its configuration are noted, with durations of usage of additional computing resources measured. This configuration information will be transmitted from end user machine 104 to server 131, and subsequently transferred to database 132. Server 120, using control/monitoring engine 124 will calculate the duration of temporary computing resource enablement. Configuration/computing engine 123 will apply pricing derived from the same price tables established for permanent upgrades, stored on database 133, to calculate appropriate billing information. This billing information will be passed to the order initiation for creation of an order, which is input to the order entry system such that an appropriate invoice will be generated and sent to the end user.

Further enhancement to the invention are obtained by enabling authorized provider remarketers to participate in the upgrade transaction, whether temporary or permanent. In such cases, the same components described in FIGS. 1-4 apply, and the same process steps described in FIGS. 5-10 occur. In such instances where a remarketer is a party to a transaction, the configuring, ordering, preparation, download and installation of an upgrade to end user machine 104 occur as previously described. To support the requirement for the remarketer to set prices and term of sale for these transactions, the end user machine 104 is identified as being under remarketer sales in end user machine profile database 133. As such, no price table is established for these machines, and instead the remarketer provides pricing for requested upgrades outside of the embodiment of this invention. The remarketer participates in the embodiment of this invention by serving as the initiator of an order in steps 910 and 912 of FIG. 9. Invoices that are ultimately generated in steps 930 (FIG. 9) and 1030 (FIG. 10) are sent to the remarketer, who is liable for payment to the provider. Remarketer, in turn, invoices end user per their established prices and terms of sale.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

For example, the advantages of the present invention can be implemented in software, hardware, or in a combination thereof.

As an example, one or more aspects of the present invention can be included in an article of manufacture consisting of at least one program storage device readable by a machine, tangibly embodying at least one program of instructions executable by the machine to perform the capabilities of the present invention.

The flow diagrams depicted herein are just examples. Many variations of these diagrams, or the steps described therein, may be possible within the spirit and scope of the present invention. For example, steps may be performed in different sequence, steps may be added or modified. All such variations are considered part of the claimed invention.

What is claimed is:

1. A computer method for providing a configuration change of computing resources of an end user machine to a customer, the method comprising:

a computer provider server negotiating configuration change price with a customer for the purchase of ordered a customer selected configuration change of computing resources of the end user machine, said negotiated configuration change price for billing said customer for the purchase of said customer selected configuration change of computing resource of the end user machine;

the computer provider server receiving an order from the customer by way of a workstation for the customer selected configuration change of computing resources of the end user machine, the provider server having a predetermined time period for accepting the configuration change of the end user machine; and responsive to the customer taking delivery of said customer selected configuration change of computing resources of the end user machine within said predetermined time period, the computer provider server billing said customer for said delivered customer selected configuration; and responsive to the customer not taking delivery of said customer selected configuration change of computing resources of the end user machine within said predetermined time period, the computer provider server cancelling said order and cancelling said billing according to said configuration change price based on expiration of said predetermined time period.

2. The method according to claim 1, wherein enabling the selected configuration change of computing resources of the end user machine comprises executing control code, wherein the customer taking delivery of said configuration change comprises the customer causing the control code to be downloaded.

3. The method according to claim 2, further comprising the computer provider server generating an invoice upon customer download of said control code.

4. The method according to claim 2, further comprising:
the computer provider server receiving data prior to said downloading, said data indicative of a current hardware configuration of said end user machine, said data reflecting currently installed hardware resources, currently enabled hardware resources, and dormant hardware resources; and
modifying said received data upon customer installation of said configuration change, said modified received data indicative of a new hardware configuration of said customer computer system and reflecting hardware resources enabled by said customer selected configuration change of computing resources of the end user machine.

5. The method according to claim 4, wherein said dormant resources include one or more of processing units, memory and Input/Output hardware.

6. The method according claim 4, further comprising, prior to said customer taking delivery of said customer selected configuration change of computing resources of the end user machine, presenting to said customer, information describing a current hardware configuration of said upgradeable computer system, and information describing said set of dormant resources available to be enabled.

7. The method according to claim 1, further comprising, prior to said downloading, generating a pricing methodology for enabling said subset of dormant resources.

8. The method according to claim 7, wherein said generating pricing methodology comprises:
establishing a price per unit of performance of said end user machine;
storing a plurality of performance values, each of said performance values being indicative of the increase in performance expected to be achieved by enabling dormant resources; and
generating an order price by multiplying said price per unit of performance by a sum of performance values associated with said dormant resources.

9. At least one tangible program storage device readable by a computer system, embodying at least one program of instructions, executable by the computer system to perform a method of providing a configuration change of computing resources of an end user machine to a customer, the method comprising:
a computer provider server negotiating configuration change price with a customer for the purchase of ordered a customer selected configuration change of computing resources of the end user machine, said negotiated configuration change price for billing said customer for the purchase of said customer selected configuration change of computing resource of the end user machine;
the computer provider server receiving an order from the customer by way of a workstation for the customer selected configuration change of computing resources of the end user machine, the provider server having a predetermined time period for accepting the configuration change of the end user machine; and
responsive to the customer taking delivery of said customer selected configuration change of computing resources of the end user machine within said predetermined time period, the computer provider server billing said customer for said delivered customer selected configuration; and responsive to the customer not taking delivery of said customer selected configuration change of computing resources of the end user machine within said predetermined time period, the computer provider server cancelling said order and cancelling said billing according to said configuration change price based on expiration of said predetermined time period.

10. The program storage device according to claim 9, wherein enabling the selected configuration change of computing resources of the end user machine comprises executing control code, wherein the customer taking delivery of said configuration change comprises the customer causing the control code to be downloaded.

11. The program storage device according to claim 10, further comprising the computer provider server generating an invoice upon customer download of said control code.

12. The program storage device according to claim 10, further comprising:
the computer provider server receiving data prior to said downloading, said data indicative of a current hardware configuration of said end user machine, said data reflecting currently installed hardware resources, currently enabled hardware resources, and dormant hardware resources; and
modifying said received data upon customer installation of said configuration change, said modified received data indicative of a new hardware configuration of said customer computer system and reflecting hardware resources enabled by said customer selected configuration change of computing resources of the end user machine.

13. The program storage device according claim 12, further comprising, prior to said customer taking delivery of said customer selected configuration change of computing resources of the end user machine, presenting to said customer, information describing a current hardware configuration of said upgradeable computer system, and information describing said set of dormant resources available to be enabled.

14. The program storage device of claim 10, further comprising, prior to said downloading, generating a pricing methodology for enabling said subset of dormant resources.

15. The program storage device of claim 14, wherein said generating pricing methodology comprises:
establishing a price per unit of performance of said end user machine;
storing a plurality of performance values, each of said performance values being indicative of the increase in performance expected to be achieved by enabling dormant resources; and
generating an order price by multiplying said price per unit of performance by a sum of performance values associated with said dormant resources.

16. The program storage device according to claim 15, wherein said dormant resources include one or more of processing units, memory and Input/Output hardware.

17. A supplier computer system for providing a configuration change of computing resources of an end user machine to a customer, the supplier computer system comprising a processor in communications with a memory, the system configured to perform a method comprising:
a computer provider server negotiating configuration change price with a customer for the purchase of ordered a customer selected configuration change of computing resources of the end user machine, said negotiated configuration change price for billing said customer for the purchase of said customer selected configuration change of computing resource of the end user machine;

the computer provider server receiving an order from the customer by way of a workstation for the customer selected configuration change of computing resources of the end user machine, the provider server having a predetermined time period for accepting the configuration change of the end user machine; and responsive to the customer taking delivery of said customer selected configuration change of computing resources of the end user machine within said predetermined time period, the computer provider server billing said customer for said delivered customer selected configuration; and responsive to the customer not taking delivery of said customer selected configuration change of computing resources of the end user machine within said predetermined time period, the computer provider server cancelling said order and cancelling said billing according to said configuration change price based on expiration of said predetermined time period.

18. The supplier computer system according to claim 17, wherein enabling the selected configuration change of computing resources of the end user machine comprises executing control code, wherein the customer taking delivery of said configuration change comprises the customer causing the control code to be downloaded.

19. The supplier computer system according to claim 18, further comprising the computer provider server generating an invoice upon customer download of said control code.

20. The supplier computer system according to claim 18, further comprising:

the computer provider server receiving data prior to said downloading, said data indicative of a current hardware configuration of said end user machine, said data reflecting currently installed hardware resources, currently enabled hardware resources, and dormant hardware resources; and modifying said received data upon customer installation of said configuration change, said modified received data indicative of a new hardware configuration of said customer computer system and reflecting hardware resources enabled by said customer selected configuration change of computing resources of the end user machine.

21. The supplier computer system according claim 20, further comprising, prior to said customer taking delivery of said customer selected configuration change of computing resources of the end user machine, presenting to said customer, information describing a current hardware configuration of said upgradeable computer system, and information describing said set of dormant resources available to be enabled.

22. The supplier computer system according to claim 18 further comprising, prior to said downloading, generating a pricing methodology for enabling said subset of dormant resources.

23. The supplier computer system according to claim 20, wherein said dormant resources include one or more of processing units, memory and Input/Output hardware.

* * * * *